(12) United States Patent
DeLaney et al.

(10) Patent No.: US 11,591,529 B2
(45) Date of Patent: Feb. 28, 2023

(54) PROCESS FOR C5+ HYDROCARBON CONVERSION

(71) Applicant: ExxonMobil Chemical Patents Inc., Baytown, TX (US)

(72) Inventors: John R. DeLaney, The Woodlands, TX (US); John J. Monson, Bend, OR (US); Teng Xu, Houston, TX (US); Kendele S. Galvan, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 102 days.

(21) Appl. No.: 17/281,744

(22) PCT Filed: Nov. 4, 2019

(86) PCT No.: PCT/US2019/059692
§ 371 (c)(1),
(2) Date: Mar. 31, 2021

(87) PCT Pub. No.: WO2020/096974
PCT Pub. Date: May 14, 2020

(65) Prior Publication Data
US 2021/0388275 A1    Dec. 16, 2021

Related U.S. Application Data

(60) Provisional application No. 62/756,981, filed on Nov. 7, 2018.

(30) Foreign Application Priority Data

Feb. 4, 2019 (EP) .................................. 19155197

(51) Int. Cl.
*C10G 69/00* (2006.01)
*C10G 65/00* (2006.01)
(Continued)

(52) U.S. Cl.
CPC ............ *C10G 69/00* (2013.01); *B01J 19/245* (2013.01); *B01J 19/2445* (2013.01);
(Continued)

(58) Field of Classification Search
CPC .. C10G 69/00; C10G 69/14; C10G 2300/202; C10G 2300/301; C10G 2300/308;
(Continued)

(56) References Cited

U.S. PATENT DOCUMENTS 6,274,003 B1    8/2001  Friday et al.
7,972,498 B2    7/2011  Buchanan et al.
(Continued)

OTHER PUBLICATIONS

"Chevron Lummus Global Ebullated Bed Bottom-of-the-Barrel Hydroconversion (LC-Fining) Process", Avish Gupta, in Chapter 8.7 of the Handbook of Petroleum Refining Processes, 3d Ed., Robert A. Meyers, McGraw-Hill 2003.
(Continued)

*Primary Examiner* — Youngsul Jeong
*Assistant Examiner* — Jason Y Chong

(57) ABSTRACT

In some examples, hydrocarbon feed and a diluent such as steam are mixed, and heated. A vapor phase product and a liquid phase product can be separated from the heated mixture. The liquid phase product can be hydroprocessed to produce a first hydroprocessed product. A pitch and one or more hydrocarbon products can be separated from the first hydroprocessed product. The pitch can be contacted with a diluent to produce a pitch-diluent mixture. The pitch-diluent mixture can be hydroprocessed to produce a second hydroprocessed product. A hydroprocessor heavy product and a utility fluid product can be separated from the second hydroprocessed product. The diluent can be or include at least a portion of the utility fluid product. The vapor phase product can be steam cracked to produce a steam cracker effluent. A tar product and a process gas that can include
(Continued)

ethylene and propylene can be separated from the steam cracker effluent.

25 Claims, 2 Drawing Sheets

(51) Int. Cl.
*C10G 9/36* (2006.01)
*B01J 19/24* (2006.01)

(52) U.S. Cl.
CPC .......... *B01J 2219/0004* (2013.01); *B01J 2219/00038* (2013.01); *B01J 2219/00074* (2013.01); *C10G 2300/202* (2013.01); *C10G 2300/301* (2013.01); *C10G 2300/308* (2013.01); *C10G 2300/4006* (2013.01); *C10G 2300/4012* (2013.01); *C10G 2300/4018* (2013.01)

(58) Field of Classification Search
CPC .... C10G 2300/4006; C10G 2300/4012; C10G 2300/4018; C10G 2400/20; C10G 9/36; B01J 19/2445; B01J 19/245; B01J 2219/00038; B01J 2219/0004; B01J 2219/00074

See application file for complete search history.

(56) References Cited

U.S. PATENT DOCUMENTS

| | | | |
|---|---|---|---|
| 8,197,668 B2* | 6/2012 | Ou | C10G 47/34 208/50 |
| 8,658,022 B2 | 2/2014 | Bridges et al. | |
| 9,637,694 B2* | 5/2017 | Evans | C10G 69/06 |
| 10,125,329 B2 | 11/2018 | Oprins et al. | |
| 10,144,882 B2 | 12/2018 | Dindi et al. | |
| 2018/0057758 A1 | 3/2018 | Al-Ghamdi et al. | |
| 2018/0057759 A1 | 3/2018 | Kandel et al. | |

OTHER PUBLICATIONS

U.S. Appl. No. 17/282,418, filed Apr. 2, 2021 Entitled "Process for C5+ Hydrocarbon Conversion" Delaney et al.
U.S. Appl. No. 17/282,993, filed Apr. 5, 2021 Entitled "Process for C5+ Hydrocarbon Conversion" Delaney et al.
U.S. Appl. No. 17/284,598, filed Apr. 12, 2021 Entitled "Process for C5+ Hydrocarbon Conversion" Osby et al.

* cited by examiner

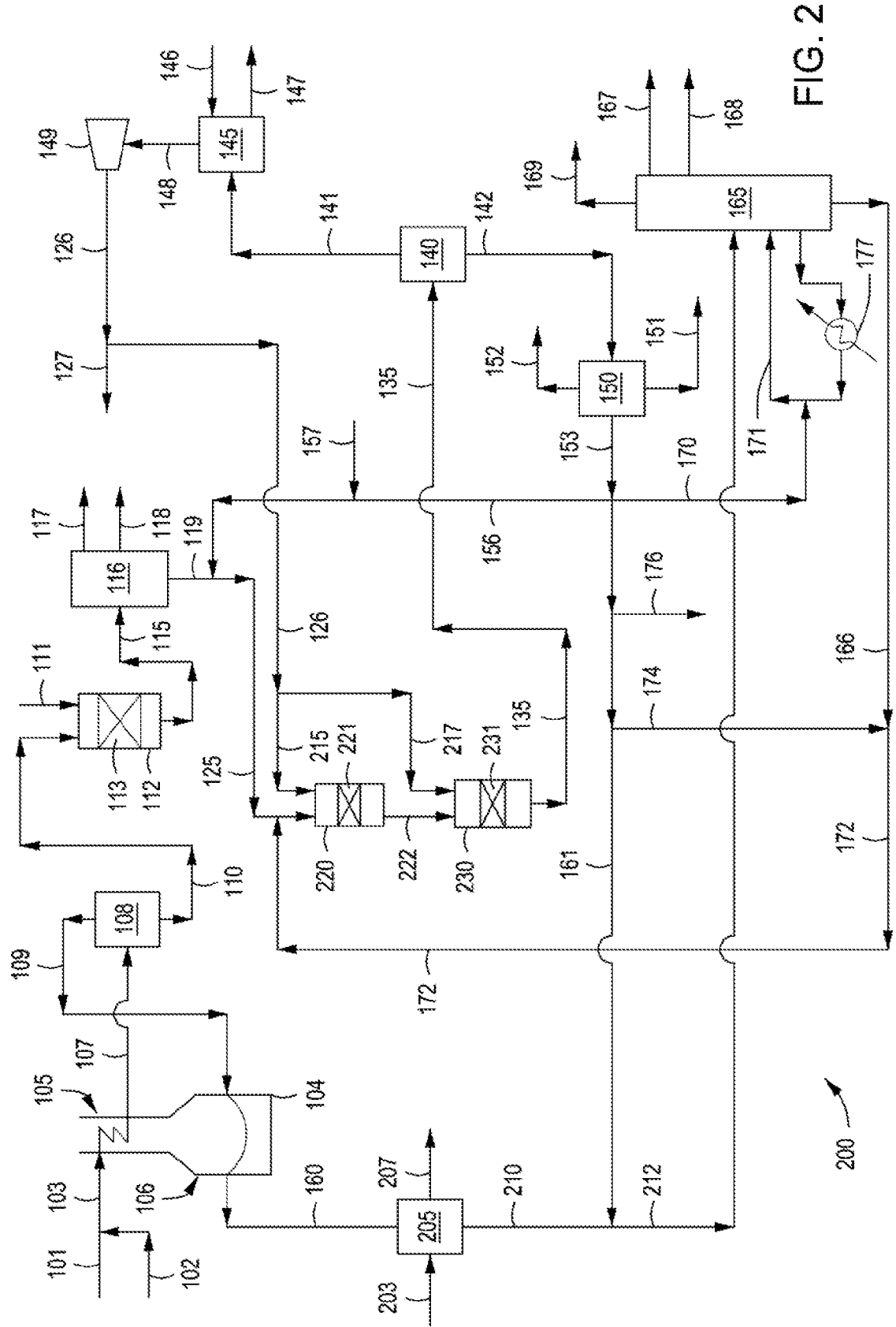

PROCESS FOR C5+ HYDROCARBON CONVERSION

CROSS-REFERENCE TO RELATED APPLICATIONS

This application is a US national phase application of PCT Application Serial No. PCT/US2019/059692 having a filing date of Nov. 4, 2019, which claims priority to and the benefit of U.S. Provisional Application No. 62/756,981 having a filing date of Nov. 7, 2018 and European Patent Application No. 19155197.7 having a filing date of Feb. 4, 2019, the disclosures of all of which are incorporated herein by reference in their entireties.

FIELD

Embodiments disclosed herein generally relate to processes for $C_{5+}$ hydrocarbon to conversion. More particularly, the processes relate to separating a vapor phase product and a liquid phase product from a heated mixture that includes steam and $C_{5+}$ hydrocarbons, hydroprocessing the liquid phase product to produce a first hydroprocessed product that includes a pitch, and hydroprocessing the pitch to produce a second hydroprocessed product that includes a fuel oil and a utility fluid.

BACKGROUND

Pyrolysis processes, e.g., steam cracking, convert saturated hydrocarbons to higher-value products, e.g., light olefins such as ethylene and propylene. A mixture of crude oil and water/steam can be heated in a convection section of a steam cracking furnace to produce a heated mixture that can be separated into a vapor phase and a liquid phase. The vapor phase can be processed in a steam cracker furnace to produce a steam cracker effluent from which various products, such as process gas, steam cracker naphtha (SCN), steam cracker gas oil (SCGO), steam cracker tar (SCT), etc., can be separated. The liquid phase of the heated mixture can be introduced to a hydroprocessor, e.g., one or more hydrotreaters, hydroisomerizers, and/or hydrocrackers, such as one or more ebullated bed or slurry hydrocrackers, to produce a hydrocracker effluent from which various products, such as low sulfur fuel oil, hydrocrackate, and pitch, can be separated.

Processes for hydroprocessing heavy hydrocarbon liquids, such as those containing petroleum resids, are disclosed in U.S. Pat. No. 7,972,498, which is incorporated by reference herein in its entirety. One such process, LC-FINING, available from Chevron Lummus Global, Bloomfield N.J., USA, utilizes an ebullated bed of catalyst comprising alumina, Mo, and Co Ni, to hydrocrack heavy oil such as petroleum resid. The process is generally described in "Chevron Lummus Global Ebullated Bed Bottom-of-the-Barrel Hydroconversion (LC-Fining) Process", Avish Gupta, in Chapter 8.7 of the Handbook of Petroleum Refining Processes, 3d Ed., Robert A. Meyers, McGraw-Hill 2003. As disclosed in the Gupta reference, LC-Fining can yield 16 vol. % to 48 vol. % of heavy hydrocarbon (pitch) having a boiling point $\geq 1022°$ F. ($\geq 550°$ C.), depending on feed characteristics and process conditions.

Pitch is typically solid at room temperature and contains material, e.g., high molecular weight constituents and inorganic solid material that tend to precipitate out and cause fouling within process equipment. As such, the equipment used in typical processes to upgrade pitch are prone to fouling during transport and processing of the pitch.

There is a need, therefore, for improved processes and systems for reducing fouling when upgrading pitch.

SUMMARY

Processes and systems for $C_{5+}$ hydrocarbon conversion are provided. In some examples, the process can include separating a vapor phase product and a liquid phase product from a heated mixture that can include diluent and a hydrocarbon feed. The liquid phase product can be hydroprocessed to produce a first hydroprocessed product. A pitch and one or more hydrocarbon products can be separated from the first hydroprocessed product. The pitch can be contacted with a diluent to produce a pitch-diluent mixture. The pitch-diluent mixture can be hydroprocessed to produce a second hydroprocessed product. A hydroprocessor heavy product and a utility fluid product can be separated from the second hydroprocessed product. The diluent can include at least a portion of the utility fluid product. The vapor phase product can be steam cracked to produce a steam cracker effluent. A tar product and a process gas that can include ethylene and propylene can be separated from the steam cracker effluent.

In another example, the process can include separating a vapor phase product and a liquid phase product from a heated mixture, wherein the heated mixture comprises diluent (e.g., an aqueous diluent such as steam) and a hydrocarbon feed. The hydrocarbon feed can include one or more of naphtha, gas oil, vacuum gas oil, waxy residues, atmospheric residues, residue admixtures, and crude oil. The liquid phase product can be hydroprocessed to produce a first hydroprocessed product. A pitch and one or more hydrocarbon products can be separated from the first hydroprocessed product. The pitch can have a Conradson carbon residue of about 20 wt. % to about 30 wt. %, an °API gravity measured at a temperature of 15.8° C. of less than 5, a sulfur content of about 1 wt. % to about 3 wt. %, and a nitrogen content of about 0.3 wt. % to about 0.6 wt. %. The pitch can be combined with a diluent to produce a pitch-diluent mixture that can include about 5 wt. % to about 95 wt. % of the diluent, based on a combined weight of the pitch and the diluent. The pitch-diluent mixture can be hydroprocessed to produce a second hydroprocessed product. A hydroprocessor heavy product and a utility fluid product can be separated from the second hydroprocessed product. The diluent can include at least portion of the utility fluid product. The utility fluid product can include: (a) at least 1 wt. % of 1.0 ring class compounds, (b) at least 5 wt. % of 1.5 ring class compounds, and (c) at least 5 wt. % of 2.0 ring class compounds, where the weight percent values of (a), (b), and (c) are based on a weight of the utility fluid product. The vapor phase product can be steam cracked to produce a steam cracker effluent. A tar product and a process gas that can include ethylene and propylene can be separated from the steam cracker effluent.

In some examples, the system can include a steam cracker, a first separator, a first hydroprocessing unit, a second separator, a first transfer line, a second hydroprocessing unit, a third separator, a fourth separator and a fifth separator. The steam cracker can be configured to indirectly heat a mixture comprising an aqueous diluent (e.g., steam) and a hydrocarbon feed to produce a heated mixture and to steam crack a vapor phase product separated from the heated mixture to produce a steam cracker effluent. The first separator can be configured to separate the vapor phase product and a liquid phase product from the heated mixture. The first hydroprocessing unit can be configured to hydroprocess the liquid phase product to produce a first hydroprocessed product. The second separator can be configured to separate a pitch and one or more hydrocarbon products form the first hydroprocessed product. The first transfer line can be configured to introduce a diluent to the pitch to produce a pitch-diluent mixture. The second hydroprocessing unit can be configured to hydroprocess the pitch-diluent mixture to produce a second hydroprocessed product. The third separator can be configured to separate a second vapor phase product and a second liquid phase product from the second hydroprocessed product. The fourth separator can be configured to separate a hydroprocessor heavy product and a utility fluid product from the second liquid phase product. The diluent can include a first portion of the utility fluid product. The fifth separator can be configured to separate a tar product and a process gas comprising ethylene and propylene from the steam cracker effluent.

BRIEF DESCRIPTION OF THE DRAWINGS

The drawings described herein are for illustrative purposes only of selected embodiments and not all possible implementations, and are not intended to limit the scope of the present disclosure. Corresponding reference numerals indicate corresponding parts throughout the drawings.

FIG. 2 depicts a schematic of another illustrative system for steam cracking a vapor phase product, hydroprocessing a liquid phase product, separating a pitch from the hydroprocessed product, hydroprocessing the pitch to produce a second hydroprocessed product, and separating products therefrom, according to one or more embodiments described.

DETAILED DESCRIPTION

Figure 1:
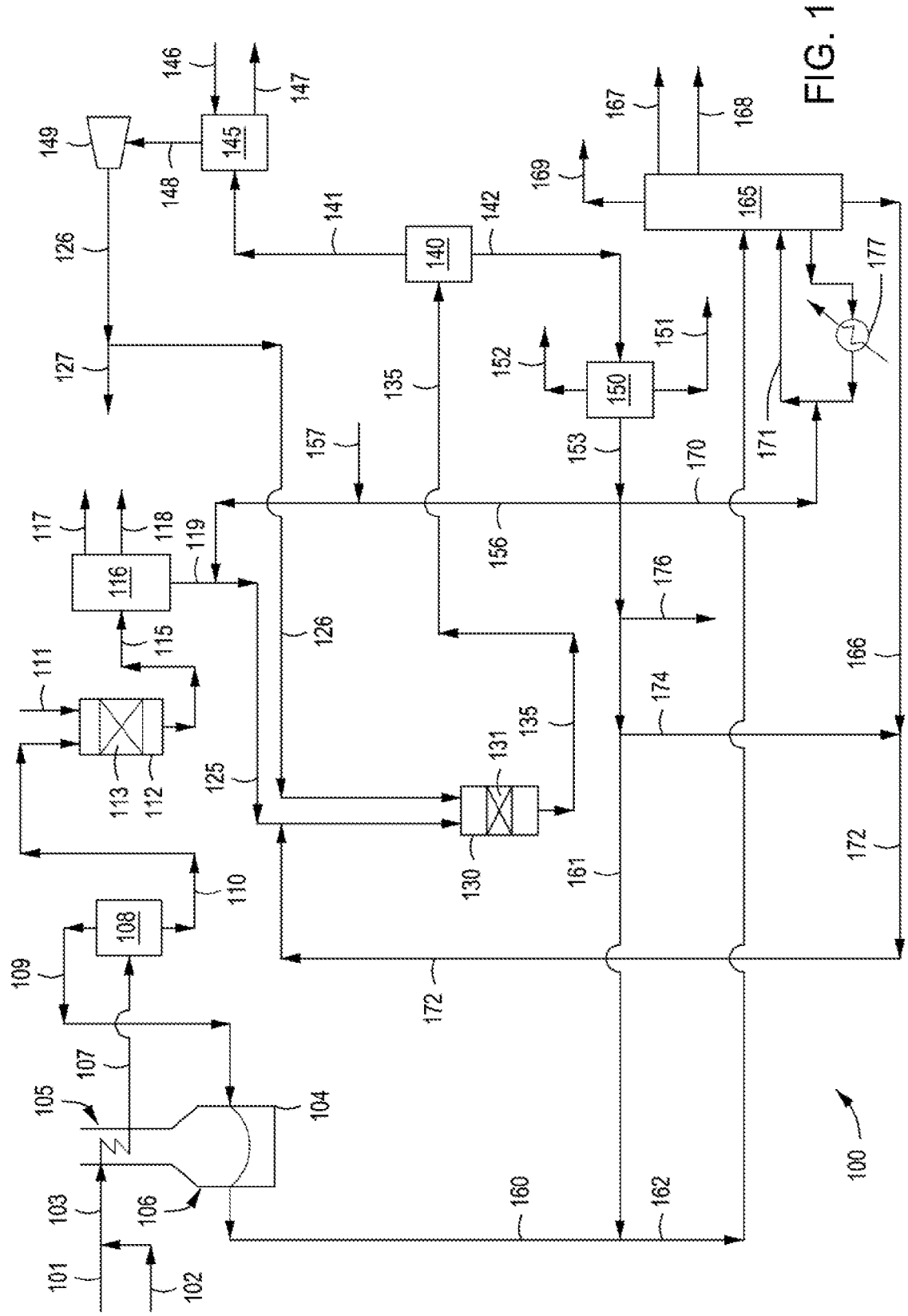
FIG. 1 depicts a schematic of an illustrative system for steam cracking a vapor phase product, hydroprocessing a liquid phase product, separating a pitch from the hydroprocessed product, hydroprocessing the pitch to produce a second hydroprocessed product, and separating products therefrom, according to one or more embodiments described.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

A hydrocarbon feed comprising one or more hydrocarbons can be mixed, blended, combined, or otherwise contacted with water, steam, or a mixture thereof and heated to produce a heated mixture. A vapor phase product or "first vapor phase product" and a liquid phase product or "first liquid phase product" can be separated from the heated mixture. The first liquid phase product can be hydroprocessed to produce a first hydroprocessed product and a pitch and one or more hydrocarbon products can be separated from the first hydroprocessed product. The pitch and a diluent can be mixed, blended, combined, or otherwise contacted to produce a pitch-diluent mixture that can be hydroprocessed to produce a second hydroprocessed product that can include, but is not limited to, a hydroprocessor heavy product and a utility fluid product. The hydroprocessor heavy product and the utility fluid product can be separated from the second hydroprocessed product. The diluent can be or include the utility fluid product or "first portion" of the utility fluid product. In some examples, the hydroprocessor heavy product can be further processed, e.g., by additional hydroprocessing, to produce a low sulfur fuel oil boiling-range product that can be suitable for use as a fuel oil or a blending constituent thereof.

The first vapor phase product can be steam cracked to produce a steam cracker effluent. A tar product and a process gas that can include, but is not limited to, ethylene and propylene can be separated from the steam cracker effluent. Although all of the utility fluid product can be utilized as the diluent or a blending constituent thereof, this is not required. As such, the utility fluid product can be divided into a plurality of portions. The first portion of the utility fluid product can be utilized as the diluent or as a blend component of the diluent. In some examples, the steam cracker effluent can be contacted with a quench fluid that can be or include a second portion of the utility fluid product to produce a cooled steam cracker effluent. In some examples, during separation of the tar product and the process gas, the steam cracker effluent or the cooled steam cracker effluent can be contacted with a third portion of the utility fluid product. In some examples, the pitch, the steam cracker effluent, and/or the cooled steam cracker effluent can be at a temperature of $\geq 200°$ C., $\geq 300°$, or $\geq 400°$ C. when initially contacted with the diluent, the quench fluid, or the third portion of the utility fluid, respectively.

It has been surprisingly and unexpectedly discovered that combining the diluent, which can be or include the first portion of the utility fluid product, with the pitch can reduce or prevent fouling within equipment, e.g., pipes, through which the pitch-diluent mixture can be conveyed or otherwise transported, e.g., to a hydroprocessing unit. It has also been surprisingly and unexpectedly discovered that the pitch-diluent mixture can be hydroprocessed with a decreased amount of fouling or no fouling within the hydroprocessing unit and/or with a reduced rate of deposition of coke and/or other heavy hydrocarbons on the catalyst used to hydroprocess the pitch.

In some examples, the diluent can be the utility fluid product, i.e., the first portion of the utility fluid product. In other examples, the diluent can be a mixture that can include the first portion of the utility fluid product and optionally fuel oil, hydroprocessed tar, steam cracker naphtha, steam cracker gas oil, or any mixture thereof. The diluent can include $\geq 10$ wt. %, $\geq 25$ wt. %, $\geq 50$ wt. %, or $\geq 75$ wt. % or in an amount of about 25 wt. % to about 100 wt. % or about 50 wt. % to about 100 wt. % of the first portion of the utility fluid product, based on a weight of the diluent.

In some examples, the amount of the diluent combined with the pitch can produce a pitch-diluent mixture that includes about 5 wt. %, about 25 wt. %, or about 40 wt. % to about 70 wt. %, about 80 wt. %, or about 95 wt. % of the diluent, based on a combined weight of the diluent and the pitch. In some examples, the amount of the first portion of the utility fluid product contacted with the pitch can produce a pitch-diluent mixture that includes about 5 wt %, about 10 wt %, or about 15 wt % to about 50 wt %, about 60 wt %, about 70 wt %, about 80 wt %, about 85 wt %, about 90 wt %, or about 95 wt % of the first portion of the utility fluid product, based on a combined weight of the pitch and the diluent.

It has also been surprisingly and unexpectedly discovered that directly contacting the steam cracker effluent with a quench fluid that can be or include the utility fluid product or "second portion" of the utility fluid product can reduce or prevent fouling within the equipment, e.g., pipes and heat exchangers, through which the steam cracker effluent can be conveyed or otherwise transported, e.g., to a separator for separation into the tar product and the ethylene and/or the propylene. Those skilled in the art will appreciate that the amount of the quench fluid contacted with the steam cracker effluent should be sufficient to cool the steam cracker effluent to facilitate separation of the desired products in a primary fractionator. Although the amount of quench fluid needed to do this can vary considerably from facility to facility, the quench fluid: steam cracker effluent weight ratio is typically in the range of from about 0.1 to about 10, e.g., 0.5 to 5, such as 1 to 4. The desired weight ratio in a particular instance can be determined, e.g., from factors such as the amount of steam cracker effluent to be cooled, the temperature of the steam cracker effluent at the quenching location, the composition and thermodynamic properties (e.g., enthalpy, $C_P$, etc.) of the quench fluid and the steam cracker effluent, the desired temperature of the quench fluid-steam cracker effluent mixture (namely the cooled steam cracker effluent) at the primary fractionator inlet, etc. For example, in certain aspects the cooled steam cracker effluent includes quench fluid in an amount in the range of about 5 wt. % to about 95 wt. %, about 25 wt. % to about 90 wt. %, or about 50 wt. %, or about 80 wt. %, based on the weight of the cooled steam cracker effluent. In some examples, the quench fluid can be the utility fluid product or "second portion" of the utility fluid product. In other examples, the quench fluid can be a mixture of the second portion of the utility fluid product and one or more additional fluids. The quench fluid can typically be a mixture that can include the second portion of the utility fluid product and optionally fuel oil, hydroprocessed tar, steam cracker naphtha, steam cracker gas oil, or any mixture thereof. Less commonly, the quench fluid includes or further includes water (e.g., steam) and other aqueous compounds. In some examples, the quench fluid can include the second portion of the utility fluid product in an amount ≥10 wt. %, such as ≥25 wt. %, or ≥50 wt. %, or ≥75 wt. %, or in the range of about 25 wt. % to about 100 wt. %, or about 50 wt. % to about 100 wt. %; the weight percent values being based on a weight of the quench fluid.

It has also been surprisingly and unexpectedly discovered that the utility fluid product or the "third portion" of the utility fluid product can be contacted with the steam cracker effluent or the cooled steam cracker effluent within a separator, e.g., a fractionator, used to separate the tar product and the process gas therefrom to decrease or prevent fouling within the separator. In some examples, the steam cracker effluent or the cooled steam cracker effluent can be contacted with the third portion of the utility fluid product during separation of the tar product and the process gas at a weight ratio of the third portion of the utility fluid product to the steam cracker effluent or the cooled steam cracker effluent that is ≥0.01:1, e.g., ≥0.1:1, such as ≥1:1, or ≥5:1, or in the range of about 0.5:1 to about 4:1, or about 1:1 to about 4:1. The weight of the cooled steam cracker effluent equals the sum of the weight of the steam cracker effluent plus the weight of the quench fluid combined therewith.

In some examples, the diluent, which can be or can include the first portion of the utility fluid product, can be contacted with the pitch to produce the pitch-diluent mixture and the quench fluid, which can be or can include the second portion of the utility fluid product, can be contacted with the steam cracker effluent to produce the cooled steam cracker effluent. In other examples, the diluent, which can be or can include the first portion of the utility fluid product, can be contacted with the pitch to produce the pitch-diluent mixture and the third portion of the utility fluid product can be contacted with the steam cracker effluent within the separator during separation of the tar product and the process gas. In still other examples, the diluent, which can be or can include the first portion of the utility fluid product, can be contacted with the pitch to produce the pitch-diluent mixture; the quench fluid, which can be or can include the second portion of the utility fluid product, can be contacted with the steam cracker effluent to produce the cooled steam cracker effluent; and the third portion of the utility fluid product can be contacted with the cooled steam cracker effluent within the separator during separation of the tar product and the process gas.

FIG. 1 depicts a schematic of an illustrative system 100 for steam cracking a vapor phase product, hydroprocessing a liquid phase product, separating a pitch from the hydroprocessed product, hydroprocessing the pitch to produce a second hydroprocessed product, and separating products therefrom, according to one or more embodiments. A hydrocarbon-containing feed, e.g., a feed containing $C_{5+}$ hydrocarbons, via line 101 and water, steam, or a mixture of water and steam via line 102 can be mixed, blended, combined, or otherwise contacted to produce a mixture via line 103. The mixture can include about 10 wt. % to about 95 wt. % of the water and/or steam, based on a combined weight of the hydrocarbon feed and the water and/or steam. In some examples, the hydrocarbon feed in line 101 that can be mixed, blended, combined, or otherwise contacted with the water and/or steam in line 102 to produce the mixture in line 103 can be or include the hydrocarbons or hydrocarbon feeds disclosed in U.S. Pat. Nos. 7,993,435; 8,696,888; 9,327,260; 9,637,694; 9,657,239; and 9,777,227; and International Patent Application Publication No. WO 2018/111574.

The mixture in line 103 can be heated, e.g., to a temperature of about 450° C. to about 585° C., to produce a heated mixture. For example, the mixture in line 103 can be heated in a convection section 105 of a furnace 104 to produce the heated mixture via line 107. The first vapor phase product and the first liquid phase product can be separated from the heated mixture by introducing the heated mixture via line 107 into one or more separators of a "first separation stage" 108. The first vapor phase product via line 109 and the first liquid phase product via line 110 can be recovered from the first separation stage 108. In some examples, the first separation stage 108 can be or include the separators disclosed in U.S. Pat. Nos. 7,138,047; 7,090,765; 7,097,758; 7,820,035; 7,311,746; 7,220,887; 7,244,871; 7,247,765; 7,351,872; 7,297,833; 7,488,459; 7,312,371; 6,632,351; 7,578,929; and 7,235,705. Although steam can be used to strip additional hydrocarbon from the first liquid phase product to the first vapor phase product, e.g., by introducing steam into a lower region of separation stage 108, this not required. In certain aspects such steam stripping is not carried out, e.g., to lessen the amount of fouling in the separation vessel. In some examples, the first liquid phase product can be sold as a product. For example, the first liquid phase product in line 110 can be conducted away, stored, and/or sold or used as a fuel oil (of relatively-high sulfur content, similar to that of conventional vacuum tower bottoms) or a fuel blending component. In other aspects (not shown), the hydrocarbon of line 101 is heated preheated before steam and/or water is added via lime 102. The preheating can be carried out in by introducing the hydrocarbon of line 101 into pre-heat convection coils (not shown) located in convection section 105 of furnace 104. Typically the preheat coils are located downstream (with respect to furnace flue gas flow) of the convection coils shown in the figure, but this is not required. The preheated hydrocarbon can be transferred out of the furnace, combined with water and/or steam via added line 102, with the mixture being re-introduced into the convection section for additional heating in the convection coils shown in the figure, to produce the heated mixture. Alternatively or in addition, the hydrocarbon of line 101 can be pre-heated by an indirect transfer of heat from, e.g., one or more of steam (not shown), the first liquid phase product of line 110, and effluent in line 160.

The first liquid phase product in line 110 and molecular hydrogen via line 111 can be introduced to one or more first hydroprocessing units 112. The first liquid phase product can be hydroprocessed in the presence of the molecular hydrogen and a catalyst, e.g., catalyst bed 113, to produce a first hydroprocessed product via line 115. The first hydroprocessed product via line 115 can be introduced to one or more separators of a "second separation stage" 116 and two or more products can be separated therefrom. For example, the pitch via line 119 and the one or more hydrocarbon products, e.g., a low sulfur fuel oil via line 117 and/or a hydrocrackate via line 118 can be recovered from the separator of the second separation stage 116.

Conventional hydroprocessing processes can be used for processing the first liquid phase product, but the invention is not limited thereto. For example, the resid hydroprocessing processes disclosed in U.S. Pat. No. 7,972,498 can be used, e.g., H-Oil; Chevron RDS, VRDS, and OCR; LC-Fining; HYVAHL; and EST (Snamprogetti). In some examples, the first liquid phase product in line 110 can be hydroprocessed at a temperature ("$T_{FLP}$")≥200° C., typically in the range of from 350° C. to 500° C., e.g., 400° C. to 450° C. a total pressure ($P_{FLP}$)≥3.5 MPa, e.g., ≥6 MPa, such as in the range of from 10.3 MPa to 20.7 MPa, a hydrogen partial pressure ≥3 MPa, e.g., in the range of from 7.6 MPa to 17 MPa, a hydrogen consumption ≥100 N m$^3$//m$^3$, e.g., in the range of from 100 N m$^3$//m$^3$ to 400 N m$^3$//m$^3$, such as 120 N m$^3$//m$^3$ to 340 N m$^3$//m$^3$; and a conversion of the 525° C.+ feed fraction of ≥40 vol. %. In a particular aspect, the hydroprocessing conditions include a total pressure in the range of from 11.7 MPa to 18.6 MPa, a temperature (measured at the reactor outlet) in the range of from 330° C. to 440° C., 725+−100 deg F., (measured at reactor outlet), and a molecular hydrogen supply (feed volume basis) of 500 N m$^3$/M$^3$ to 570 N m$^3$/m$^3$ processed at 0.1 to 0.3 WHSV.

The pitch in line 119 can be mixed, blended, combined, or otherwise contacted with a diluent in line 156 to produce a pitch-diluent mixture via line 125. For example, a first portion of the utility fluid product via line or "first transfer line" 156 can be combined with the pitch in line 119 to produce the pitch-diluent mixture in line 125. The pitch-diluent mixture via line 125 and molecular hydrogen via line 126 can be introduced into one or more hydroprocessing stages (a pitch hydroprocessor) 130 to produce the second hydroprocessed product via line 135. The pitch-diluent mixture can be hydroprocessed in the presence of the molecular hydrogen and a catalyst, e.g., a catalyst bed 131, under hydroprocessing conditions sufficient to produce the second hydroprocessed product via line 135. Illustrative processes and systems that can be used to hydroprocess the pitch-diluent mixture can include those disclosed in U.S. Pat. Nos. 9,090,836; 9,637,694; and 9,777,227; and International Patent Application Publication No. WO 2018/111574.

Pitch hydroprocessing conditions typically include a temperature ("$T_P$")≥200° C.; a total pressure ("$P_P$")≥3.5 MPa, e.g., ≥6 MPa; a weight hourly space velocity ("WHSV$_P$") ≥0.2 hr$^{-1}$, ≥0.25 hr$^{-1}$, or ≥0.3 hr$^{-1}$ based on the weight of the pitch-diluent mixture of line 125 that is subjected to the pitch hydroprocessing; and a total amount of molecular hydrogen supplied to the pitch hydroprocessor that is ≥1000 standard cubic feet per barrel of pitch-diluent mixture of line 125 that is subjected to the pitch hydroprocessing (178 S m$^3$/m$^3$). Conditions can be selected within the pitch hydroprocessing conditions to achieve a 566° C.+ conversion of ≥20 wt. % substantially continuously for at least ten days at a molecular hydrogen consumption rate of about 2200 standard cubic feet per barrel of pitch in the pitch-diluent mixture of line 125 (SCF/B) (392 S m$^3$/m$^3$) to about 3200 SCF/B (570 S m$^3$/m$^3$). In some examples, the pitch hydroprocessing conditions can be the same or similar to the hydroprocessing conditions, e.g., the intermediate hydroprocessing conditions, disclosed in WO Publication No. WO2018/111574.

The second hydroprocessed product via line 135 can be introduced to one or more separators of a "third separation stage" 140 and a vapor phase product or "second vapor phase product" via line 141 and a liquid phase product or "second liquid phase product" via line 142 can be separated therefrom. The second vapor phase product via line 141 can be introduced to one or more upgrading units 145, e.g., one or more amine towers. For example, fresh amine via line 146 can be introduced to the upgrading unit 145 and a rich amine via line 147 can be recovered therefrom. A regenerated treat gas, which can be or include molecular hydrogen, via line 148 can be compressed in one or more compressors 149 to produce at least a portion of the molecular hydrogen in line 126. In some examples, at least a portion of the regenerated treated gas via line 127 can be removed from the system 100 and/or introduced the first hydroprocessing unit 112 via line 111. In other examples, at least a portion of the molecular hydrogen in line 126 can be separated from a process gas in line 169, which can include molecular hydrogen as discussed in more detail below.

The second liquid phase product via line 142 can be introduced to one or more separators of a "fourth separation stage" 150. Optionally, the functions of stages 140 and 150 can be carried out in one separation stage (not shown). In some examples, a hydroprocessor heavy product via line 151, an overhead or vapor via line 152, and the utility fluid via line 153 can be recovered from the fourth separation stage 150. The diluent or at least a portion of the diluent in line 156, and the utility fluid in lines 161, 170, and 174 can be supplied from the utility fluid in line 153. In some examples, excess or surplus utility fluid via line 176 can be recovered from the system 100. In some examples, one or more additional diluents via line 157 can be mixed, blended, combined, or otherwise contacted with the first portion of the utility fluid product in line 156 to produce the diluent that can be combined with the pitch in line 119. In other examples, the additional diluent via line 157 can be introduced directly to the pitch in line 119 and/or the pitch-diluent mixture in line 125. In some examples, the hydroprocessor heavy product via line 151, overhead or vapor via line 152, and the utility fluid product via line 153 can be separated from the first hydroprocessed product according to the processes and systems disclosed in U.S. Pat. Nos. 9,090,836; 9,637,694; 9,777,227; and International Patent Application Publication No. WO 2018/111574. In certain aspects, the utility fluid of line 153 can include partially hydrogenated 2-4 ring molecules, such as dihydroanthracene and tetralin. These molecules can readily transfer hydrogen radicals to reactive free radicals in steam cracker effluent (e.g., of line 160) and/or pitch (e.g., of line 119) to make stable products. An exemplary equation for the radical transfer is shown below:

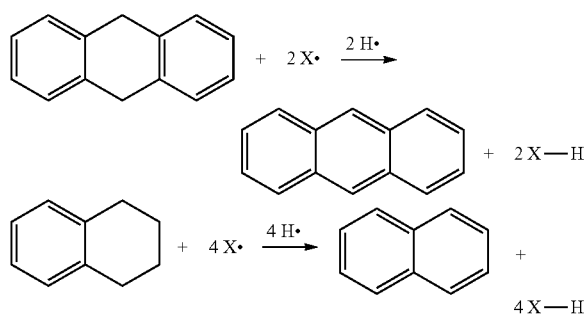

where X' refers to a radical species, and H' refers to a hydrogen radical. Since pitch hydroprocessing, tar hydroprocessing, and/or pitch-tar hydroprocessing generates excess utility fluid (i.e., beyond that needed as a flux/solvent during pitch hydroprocessing or pitch-tar hydroprocessing), at least a portion of the excess utility fluid can be used as a quench oil to quench the effluent flowing from a steam cracker and/or a transfer line exchanger ("TLE"). The relatively high temperature during quench facilitates hydrogen transfer from the mid-cut to the free radicals. The concentration of the donatable hydrogen in a sample of the utility fluid and other characteristics of the utility fluid are disclosed in U.S. Patent Application No. 62/716,754. Returning to the first vapor phase product in line 109, the first vapor phase product can be introduced to a radiant section 106 of the furnace 104 to produce a steam cracker effluent, which can be conducted away via line 160. Typically, the vapor phase product is at a temperature heated to a temperature of ≥400° C., e.g., a temperature in the range of about 425° C. to about 825° C. at the radiant section inlet. If needed, the vapor phase product in line 109 can be heated in the convection section 105 of the furnace 104 prior to introducing the vapor phase product to the radiant section 106 of the furnace 104. In some examples, additional water and/or steam can be mixed, blended, combined, or otherwise contacted with the vapor phase product in line 109 before introducing the vapor phase product to the radiant section 106 of the furnace 104 for steam cracking. In some examples, the vapor phase product in line 109 can be steam cracked according to the processes and systems disclosed in U.S. Pat. Nos. 6,419,885; 7,993,435; 9,637,694; and 9,777,227; and International Patent Application Publication No. WO 2018/111574.

In some examples, the steam cracker effluent in line 160 can be mixed, blended, combined, or otherwise contacted with the quench fluid in line or "second transfer line" 161 to produce a cooled steam cracker effluent in line 162. In some examples, the steam cracker effluent in line 160 can be at a temperature of ≥300° C., ≥400° C., ≥500° C., ≥600° C., or ≥700° C., or ≥800° C., or more when initially contacted with the quench fluid in line 161. In certain aspects, the greatest temperature of the steam cracker effluent in line 160 can be in the range of about 425° C. to 850° C., e.g., about 450° C. to about 800° C., when initially contacted with the quench fluid in line 161. Typically, the quenching is carried out with sufficient quench fluid to decrease the temperature of the steam cracker effluent at the quench location (e.g., before and/or after a TLE) from an initial temperature $T_1$, e.g., in the range of 600° C. to 850° C., to a final temperature, $T_2$ e.g., in the range of 250° C. to 500° C. to slow down the reactions that lead to excessive coke and gas formation. Typically $T_1-T_2 \geq 100°$ C., e.g., ≥125° C., such as ≥150° C. The quenching typically results in the formation of a two-phase mixture, e.g., a mixture comprising (i) a vapor phase and (ii) a liquid phase containing steam cracker tar. Locations for carrying out the quenching are described in U.S. Patent Application Publication No. 2014/0061100, which is incorporated by reference herein in its entirety. In certain aspects the quench fluid is not hydroprocessed, such as when the quench fluid comprises primary fractionator bottoms.

The steam cracker effluent via line 160 or, as shown, the cooled steam cracker effluent via line 162 can be introduced to one or more separators of a "fifth separation stage" 165. In some examples, a tar product via line 166 (e.g., obtained from primary fractionator bottoms and/or a tar knock-out drum located in stage 165) and one or more additional products, e.g., steam cracker naphtha via line 167, steam cracker gas oil via line 168, and/or a process gas via line 169, can be recovered from the fifth separation stage 165. In some examples, products that can be separated from the process gas in line 169 can include, but are not limited to, a tail gas, ethane, ethylene, propane, propylene, crude $C_4$ hydrocarbons, or any combination thereof. The fifth separation stage 165 can be or include one or more fractionators, knockout drums, a combined quench tower and primary fractionator, a compressor, contaminant removal units, e.g., $CO_2$ and/or $H_2S$ removal units, acetylene converter, etc. In some examples, the products that can be separated from the steam cracker effluent or the cooled steam cracker effluent can be separated according to the processes and systems disclosed in U.S. Patent Application Publication No. 2014/0357923.

In some examples, the steam cracker effluent or, as shown, the cooled steam cracker effluent, can be contacted with the third portion of the utility fluid product via line or "third transfer line" 170 during separation of the tar product and the one or more additional products. In some examples, the third portion of the utility fluid product via line 170 can be introduced to a reflux or bottoms pump-around ("BPA") line 171 recovered and recycled to the fifth separation stage 165. Heat transfer stage 177 can be used to regulate the temperature of the bottoms, adding or removing heat to/from the BPA as needed to (i) maintain stage 165 (particularly a primary fractionator in stage 165) operating as desired and (ii) to maintain primary fractionator bottoms at a temperature and residence time sufficient to transfer hydrogen from the utility fluid product to the bottoms. In other examples, the third portion of the utility fluid product via line 171 can be introduced directly to one or more separations of the fifth separation stage 165.

Although at least a portion of the tar product can be used as a fuel, it is typically subjected to at least one hydroprocessing stage to produce products of greater utility. It has surprisingly been found that the tar product via line 166 can be mixed, blended, combined, or otherwise contacted with the pitch-diluent mixture in line 125 to produce a pitchdiluent-tar mixture that can be introduced into the second hydroprocessing unit 130 to produce the second hydroprocessed product via line 135. Considering the appreciable compositional differences between SCT and pitch (e.g., the greater olefin and vinyl aromatic content in SCT compared to pitch), it was expected that these streams would be incompatible, and co-processing them in stage 130 would lead to fouling, e.g., in bed 131. It is therefore surprising that this is not the case. For example, the tar product in line 166 can be mixed, blended, combined, or otherwise contacted with the utility fluid product or "fourth portion" of the utility fluid product via line or "fourth transfer line" 174 and a tar-utility fluid mixture via line 172 can be contacted with the pitch-diluent mixture in line 125, directly introduced to the second hydroprocessing unit 130, introduced into another treatment unit, e.g., another hydroprocessing unit, and/or removed from the system 100. The pitch-diluent-tar mixture that can be produced by contacting the pitch-diluent mixture with the tar product or the tar-utility fluid mixture can be subjected to the pitch hydroprocessing conditions discussed and described herein.

FIG. 2 depicts a schematic of another illustrative system 200 for steam cracking a vapor phase product, hydroprocessing a liquid phase product, separating a pitch from the hydroprocessed product, hydroprocessing the pitch to produce a second hydroprocessed to product, and separating products therefrom, according to one or more embodiments. The system 200 can be similar to the system 100, but can further include one or more heat exchangers 205, one or more stages of pre-treater hydroprocessing 220 for pre-treating the pitch-diluent mixture or the pitch-tar-diluent mixture of line 125 under pre-treatment hydroprocessing conditions at a location upstream of pitch hydroprocessing, and one or more stages of hydroprocessing 230 for hydroprocessing the pre-treated pitch or the pre-treated pitch-tar-diluent mixture of line 222 under pitch hydroprocessing conditions.

In some examples, the steam cracker effluent in line 160 and water or steam via line 203 can be introduced to one or more heat exchangers (one is shown, 205) to produce a pre-cooled steam cracker effluent via line 210 and steam, superheated steam, or superheated high pressure steam via line 207. The pre-cooled steam cracker effluent in line 210 can be introduced to the fifth separation stage 165 or, as shown, the pre-cooled steam cracker effluent in line 210 can be mixed, blended, combined, or otherwise contacted with the third portion of the utility fluid product in line 161 to produce a cooled steam cracker effluent in line 212 that can be introduced to the fifth separation stage 165 and processed as discussed and described above with reference to FIG. 1.

The pitch-diluent mixture or the pitch-diluent-tar mixture via line 125 and molecular hydrogen via line 215 can be introduced to pre-treater hydroprocessor 220. The pre-treater hydroprocessing can be carried out in the presence of the molecular hydrogen from line 215 and a first catalyst, e.g., catalyst bed 221, under a set of hydroprocessing conditions (pre-treater hydroprocessing conditions) to produce an intermediate or pre-treated hydroprocessed product via line 222.

The pre-treated hydroprocessed product via line 222 and optionally molecular hydrogen via line 217 can be introduced to the pitch hydroprocessor 230. In some examples, in addition to or in lieu of introducing molecular hydrogen via line 217, molecular hydrogen can be cascaded from the pre-treater hydroprocessor 220 into the pitch hydroprocessor 230 with the pre-treated hydroprocessed tar product via line 222. The pre-treated hydroprocessed product can be hydroprocessed in the presence of the molecular hydrogen and a second catalyst, e.g., catalyst bed 231, to produce the second hydroprocessed product that can be conducted away via line 135. It should be understood that any number of hydroprocessing units and any number of hydroprocessing conditions can be used to produce the second hydroprocessed product in line 135.

Pre-treater hydroprocessing conditions can include a temperature $T_{PT} \leq 400°$ C., a space velocity (WHSV$_{PT}$)$\geq 0.2$ hr$^{-1}$, $\geq 0.25$ hr$^{-1}$, or $\geq 0.3$ hr$^{-1}$ based on the weight of the pitch-diluent mixture of line 125 that is subjected to the pre-treater hydroprocessing conditions, a total pressure ("P$_{PT}$") 3.5 MPa, e.g., $\geq 6$ MPa, and supplying the molecular hydrogen at a rate <3000 standard cubic feet per barrel of the pitch-diluent mixture of line 125 (SCF/B) (534 S m$^3$/m$^3$).

Pre-treater hydroprocessing conditions can be less severe than the hydroprocessing conditions utilized in the pitch hydroprocessors 130 and 230. For example, compared to pitch hydroprocessing conditions, pre-treater hydroprocessing conditions utilize one or more of a lesser hydroprocessing temperature, a lesser hydroprocessing pressure, a greater feed (tar+utility fluid) WHSV, a greater pyrolysis tar WHSV, and a lesser molecular hydrogen consumption rate. Within the parameter ranges (T, P, WHSV, etc.) specified for pre-treater hydroprocessing conditions, particular hydroprocessing conditions can be selected to achieve a desired 566° C.+ conversion, typically in the range of from 0.5 wt. % to 5 wt. % substantially continuously for at least ten days. Pitch hydroprocessor 230 can be operated under pitch hydroprocessing conditions selected from among those specified for pitch hydroprocessor 130. Stages for one or more of tar thermal treatment (e.g., heat soaking), solids-removal, and guard-bed hydroprocessing can be carried out upstream of the pretreater, as disclosed in U.S. Patent Application No. 62/716,754.

It has been discovered that the utility fluid product is a hydrogen donor that can bind with fouling precursors in the pitch, the tar product, and/or the pitch-tar mixture to decrease or prevent foulant formation during transport and/or hydroprocessing of the pitch. It has also been discovered that the utility fluid product is a hydrogen donor that can that can bind with fouling precursors in the steam cracker effluent to decrease or prevent foulant formation during transport thereof. It has also been discovered that the utility fluid product is a hydrogen donor that can also decrease or prevent fouling in a primary separation stage, e.g., within one or more separator(s) of the first separation stage 165, during separation of products from the steam cracker effluent and/or the cooled steam cracker effluent.

As used herein, the terms "utility fluid" and "utility fluid product" are used interchangeably and refer to a hydrocarbon composition that includes, but is not limited to, aromatic ring compounds. In some examples, the utility fluid product can include aromatic ring compounds and non-aromatic ring compounds. In some examples, the utility fluid product can be or include aromatic ring compounds or aromatic ring compounds and non-aromatic ring compounds, in an amount of $\geq 10$ wt. %, $\geq 20$ wt. %, $\geq 30$ wt. %, $\geq 40$ wt. %, $\geq 50$ wt. %, $\geq 60$ wt. %, $\geq 70$ wt. %, $\geq 80$ wt. %, $\geq 90$ wt. %, $\geq 95$ wt. %, or $\geq 98$ wt. %, based on a weight of the utility fluid product. In some examples, the utility fluid product can include $\geq 10$ wt. %, $\geq 20$ wt. %, $\geq 30$ wt. %, $\geq 40$ wt. %, $\geq 50$ wt. %, $\geq 60$ wt. %, $\geq 70$ wt. %, $\geq 80$ wt. %, $\geq 90$ wt. %, $\geq 95$ wt. %, or $\geq 99$ wt. % of aromatic ring compounds, based on the weight of the utility fluid product. The aromatic ring compounds can be or include 1-ring aromatic compounds, 2-ring aromatic compounds, 3-ring aromatic compounds, or any mixture thereof. The amount of aromatic ring compounds can be determined by Nuclear Magnetic Resonance, (e.g., $^{13}C$ NMR). Suitable methods for analyzing the aromatic and non-aromatic content of the utility fluid product are disclosed in U.S. Pat. No. 9,777,227 and in U.S. Patent Application Ser. No. 62/716,754.

In certain aspects, the utility fluid product can include from 0.5 to 7.0 ring class compounds, e.g., one or more of 0.5, 1.0, 1.5, 2.0, 2.5, 3.0, 3.5, 4.0, 4.5 ring class compounds. Typically, the utility fluid product comprises ≤0.1 wt. %, e.g., ≤0.05 wt. %, such as ≤0.01 wt. % total of 5.5, 6.0, 6.5, and 7.0 ring class compounds, based on the weight of the utility fluid product. Although other utility fluid products are within the scope of the invention, certain utility fluid products comprise, consist essentially of, or even consists of from 0.5 to 5.0 ring class compounds, e.g., 1.0 to 3.0 ring class compounds, such as 1.5 to 3.0 ring class compounds. In some examples, the utility fluid product can be or include, but is not limited to, (a)≥1 wt. % of 1.0 ring class compounds; (b)≥5 wt. % of 1.5 ring class compounds; and (c)≥5 wt. % of 2.0 ring class compounds, where all weight percent values are based on a weight of the utility fluid product. In other examples, the utility fluid product can be or include, but is not limited to, (a)≥1 wt. % to about 20 wt. % of 1.0 ring class compounds; (b)≥25 wt. % to about 95 wt. % of 1.5 ring class compounds; (c)≥5 wt. % to about 80 wt. % of 2.0 ring class compounds; and (d)≥0.01 wt. % to about 0.5 wt. % of 5.0 ring class compounds, where all weight percent values are based on a weight of the utility fluid product. In certain aspects the utility fluid product comprises 1 wt. % to 10 wt. % of 1.0 ring class compounds, about 30 wt. % to 60 wt. % of 1.5 ring class compounds, and about 10 wt. % to 40 wt. % of 2.0 ring class compounds. Optionally, the utility fluid comprises ≤1.0 wt. % of 4.0 ring class compounds, e.g., 0.01 wt. % to 1 wt. %; and/or ≤1.0 wt. % of 3.0 ring class compound, e.g., 0.1 wt. % to 1 wt. %. It is generally desirable for the utility fluid product to be substantially free of molecules having terminal unsaturation, for example, vinyl aromatics. The term "substantially free" in this context means that the utility fluid comprises ≤10.0 wt. % (e.g., ≤5.0 wt. % or ≤1.0 wt. %) vinyl aromatics, based on the weight of the utility fluid.

As used herein, the term "0.5 ring class compound" means a molecule having only one non-aromatic ring moiety and no aromatic ring moieties in the molecular structure. As used herein, the term "non-aromatic ring" means four or more carbon atoms joined in at least one ring structure where at least one of the four or more carbon atoms in the ring structure is not an aromatic carbon atom. Aromatic carbon atoms can be identified using $^{13}C$ Nuclear magnetic resonance, for example. Non-aromatic rings having atoms attached to the ring (e.g., one or more heteroatoms, one or more carbon atoms, etc.), but which are not part of the ring structure, are within the scope of the term "non-aromatic ring".

Examples of non-aromatic rings include a pentacyclic ring—five carbon member ring such as cyclopentane and a hexacyclic ring—six carbon member ring such as cyclohexane. It should be understood that the non-aromatic ring can be statured as exemplified above or partially unsaturated for example, cyclopentene, cyclopenatadiene, cyclohexene and cyclohexadiene. Non aromatic rings, which can primarily be six and five member non-aromatic rings, can contain one or more heteroatoms such as sulfur (S), nitrogen (N) and oxygen (O). Illustrative non-aromatic rings with heteroatoms can be or include, but are not limited to, tetrahydrothiophene, pyrrolidine, tetrahydrofuran, tetrahydro-2H-thiopyran, piperidine, and tetrahydro-2H-pyran. It should be understood that the non-aromatic rings with hetero atoms can be saturated or partially unsaturated.

As used herein, the term "1.0 ring class compound" means a molecule containing only one of the following ring moieties but no other ring moieties: (i) one aromatic ring 1•(1.0 ring) in the molecular structure, or (ii) two non-aromatic rings 2•(0.5 ring) in the molecular structure. As used herein, the term "aromatic ring" means five or six atoms joined in a ring structure where: (i) at least four of the atoms joined in the ring structure are carbon atoms, and (ii) all of the carbon atoms joined in the ring structure are aromatic carbon atoms. It should be understood that aromatic rings having atoms attached to the ring, e.g., one or more heteroatoms, one or more carbon atoms, etc., but which are not part of the ring structure are within the scope of the term "aromatic ring". Illustrative aromatic rings can be or include, but are not limited to, (i) a benzene ring such as benzene; (ii) a thiophene ring such as thiophene; (iii) a pyrrole ring such as 1H-pyrrol; and (iv) a furan ring such as furan.

When there is more than one ring in a molecular structure, the rings can be aromatic rings and/or non-aromatic rings. The ring to ring connection can be of two types: type (1) where at least one side of the ring is shared, and type (2) where the rings are connected with at least one bond. The type (1) structure is also known as a fused ring structure. The type (2) structure is also commonly known as a bridged ring structure. Some examples of the type (1) fused ring structure include, but are not limited to, naphthalene; 1,2,3,4-tetrahydronaphthalene; decahydronaphthalene, indane; and octahydropentalene. An example of the type (2) bridged ring structure can be as follows:

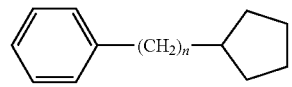

where n is an integer equal to 0, 1, 2, or 3. When there are two or more rings (aromatic rings and/or non-aromatic rings) in a molecular structure, the ring to ring connection may include all type (1) connections, all type (2) connections, or a mixture of types (1) connections and type (2) connections.

As used herein, the term "1.5 ring class compound" means a molecule containing only one of the following ring moieties, but no other ring moieties: (i) one aromatic ring 1•(1.0 ring) and one non-aromatic ring 1•(0.5 ring) in the molecular structure or (ii) three non-aromatic rings 3•(0.5 ring) in the molecular structure. As used herein, the term "2.0 ring class compound" means a molecule containing only one of the following ring moieties, but no other ring moieties: (i) two aromatic rings 2•(1.0 ring), (ii) one aromatic ring 1•(1.0 ring) and two non-aromatic rings 2•(0.5 ring) in the molecular structure, or (iii) four non-aromatic rings 4•(0.5 ring) in the molecular structure. As used herein, the term "2.5 ring class compound" means a molecule containing only one of the following ring moieties, but no other ring moieties: (i) two aromatic rings 2•(1.0 ring) and one non-aromatic rings 1•(0.5 ring) in the molecular structure, (ii) one aromatic ring 1•(1.0 ring) and three non-aromatic rings 3•(0.5 ring) in the molecular structure, or (iii) five non-aromatic rings 5•(0.5 ring) in the molecular structure. Likewise compounds of the 3.0, 3.5, 4.0, 4.5, 5.0, etc. molecular classes contain a combination of non-aromatic rings counted as 0.5 ring and aromatic rings counted as 1.0 ring, such that the total is 3.0, 3.5, 4.0, 4.5, 5.0, 5.5, 6.0, 6.5, 7.0, etc. respectively. For example, 5.0 ring class compounds contain only one of the following ring moieties: (i) five aromatic rings 5•(1.0 ring) in the molecular structure, (ii) four aromatic rings 4•(1.0 ring) and two non-aromatic rings 2•(0.5 ring) in the molecular structure, (iii) three aromatic rings 3•(1.0 ring) and four non-aromatic rings 4•(0.5 ring) in the molecular structure, (iv) two aromatic rings 2•(1.0 ring) and six non-aromatic rings 6•(0.5 ring) in the molecular structure, (v) one aromatic ring 1•(1.0 ring) and eight non-aromatic rings 8•(0.5 ring) in the molecular structure, or (vi) ten non-aromatic rings 10•(0.5 ring) in the molecular structure. It should be understood that all of the multi-ring classes can include ring compounds having hydrogen, alkyl, or alkenyl groups bound thereto, e.g., one or more of H, $CH_2$, $C_2H_4$ through $C_nH_{2n}$, $CH_3$, $C_2H_5$ through $C_nH_{2n+1}$. Generally, n is from 1 to 6, e.g., from 1 to 5.

The utility fluid product can include 0.5, 1.0, 1.5, 2.0, 2.5, 3.0, 3.5, 4.0, and/or 4.5 ring class compounds. The utility fluid product can further include 0.1 wt. % or less, 0.05 wt. % or less, or 0.01 wt. % or less of 5.0 ring class compounds, based on the weight of the utility fluid product. In some examples, the utility fluid product can include 0.1 wt. % or less, 0.05 wt. % or less, or 0.01 wt. % or less of a total amount of 5.5, 6.0, 6.5, and 7.0 ring class compounds, based on the weight of the utility fluid product. In some examples, the utility fluid product can include 0.5 to 7.0 ring class compounds. In other examples, the utility fluid product can include 0.5 to 5.0 ring class compounds. In other examples, the utility fluid product can include 1.0 to 3.0 ring class compounds.

In some examples, the utility fluid product can be or include about 1 wt. % to about 20 wt. % of 1.0 ring class compounds, about 5 wt. % to about 60 wt. % of 1.5 ring class compounds, and about 5 wt. % to about 60 wt. % of 2.0 ring class compounds, where all weight percent values are based on the weight of the utility fluid product. In other examples, the utility fluid product can include about 5 wt. % to about 22 wt. % of 1.0 ring class compounds, about 15 wt. % to about 80 wt. % of 1.5 ring class compounds, and about 10 wt. % to about 80 wt. % of 2.0 ring class compounds, where all weight percent values are based on the weight of the utility fluid product. In other examples, the utility fluid product can include about 5 wt. % to about 20 wt. % of 1.0 ring class compounds, about 35 wt. % to about 60 wt. % of 1.5 ring class compounds, and about 20 wt. % to about 80 wt. % of 2.0 ring class compounds. In other examples, the utility fluid product can include one or more of (i) 20 wt. % or less of 1.0 ring class compounds, (ii) 1 wt. % or less of 4.0 ring class compounds, and (iii) 1 wt. % or less of 3.0 ring class compounds, where all weight percent values are based on the weight of the utility fluid product.

The utility fluid product can have a 10% distillation point of ≥60° C. and a 90% distillation point of 350° C. or less, as measured according to ASTM D86-17. In some examples, the utility fluid product can have a 10% distillation point of ≥120° C., e.g., ≥140° C. or ≥150° C., and/or a 90% distillation point of 300° C. or less, as measured according to ASTM D86-17. The utility fluid product can have a critical temperature of about 285° C. to about 400° C. and include aromatics, including alkyl-functionalized derivatives thereof. The utility fluid product can have a high solvency, as measured by solubility blending number ("SBN"). In some examples, the utility fluid product can have an SBN of about 90, about 100, or about 110 to about 120, about 130, or about 140. The SBN is a parameter that relates to the compatibility of an oil with different proportions of a model solvent mixture, such as toluene/n-heptane. The SBN is related to the insolubility number ("$I_N$"), which can be determined in a similar manner, as disclosed in U.S. Pat. No. 5,871,634.

In some examples, the utility fluid product can include ≥90 wt. % of a single-ring aromatic, including those having one or more hydrocarbon substituents, such as from 1 to 3 or 1 to 2 hydrocarbon substituents. Illustrative hydrocarbon substituents or hydrocarbon groups can be or include, but are not limited to, $C_1$-$C_6$ alkyls, where the hydrocarbon groups can be branched or linear and the hydrocarbon groups can be the same or different. In some examples, the utility fluid product can include ≥90 wt. % of one or more of benzene, ethylbenzene, trimethylbenzene, xylenes, toluene, naphthalenes, alkylnaphthalenes (e.g., methylnaphthalenes), tetralins, or alkyltetralins (e.g., methyltetralins), based on the weight of the utility fluid product.

In some examples, the utility fluid product can be substantially free of molecules having terminal unsaturates, for example, vinyl aromatics. As used herein, the term "substantially free" means that the utility fluid product includes 10 wt. % or less, e.g., 5 wt. % or less or 1 wt. % or less, of terminal unsaturates, based on the weight of the utility fluid product. The utility fluid product can include ≥50 wt. % of molecules having at least one aromatic core, e.g., ≥60 wt. % or ≥70 wt. %, based on the weight of the utility fluid product. In some examples, the utility fluid product can include ≥60 wt. % of molecules having at least one aromatic core and 1 wt. % or less of terminal unsaturates, e.g., vinyl aromatics, based on the weight of the utility fluid product.

In some examples, the utility fluid product can include aromatic ring compounds and have a 10% distillation point of ≥60° C. and a 90% distillation point of 425° C. or less, as measured according to ASTM D86-17. In some examples, the utility fluid product can include ≥25 wt. % of aromatic ring compounds, based on the weight of the utility fluid product and can have a $S_{BN}$ of ≥100, or ≥120, ≥130, or ≥140, such as about 110 to about 155, or about 120 to about 150. In these and other examples, the utility fluid product can have a true boiling point distribution having an initial boiling point of ≥177° C. and a final boiling point of 566° C. or less, e.g., 430° C. or less. True boiling point distributions (the distribution at atmospheric pressure) can be measured according to ASTM D7500-15. In some examples, the utility fluid product can include aromatic ring compounds, have a 10% distillation point of ≥60° C. and a 90% distillation point of 350° C. or less, as measured according to ASTM D86-17, have a critical to temperature of about 285° C. to about 400° C., and include ≥80 wt. % of 1-ring aromatics and/or 2-ring aromatics, including alkyl-functionalized derivatives thereof, based on a weight of the utility fluid product. In other examples, the utility fluid product can include aromatic ring compounds, have a 10% distillation point of ≥60° C. and a 90% distillation point of 350° C. or less, as measured according to ASTM D86-17, have a critical temperature of about 285° C. to about 400° C., and include ≥80 wt. % of 1-ring aromatics, 2-ring aromatics, and 3-ring aromatics including alkyl-functionalized derivatives thereof, based on a weight of the utility fluid product.

As noted above, the utility fluid product can be produced by hydroprocessing the pitch, the tar product, and/or the pitch-tar product mixture. In some examples, the utility fluid product can be the substantially similar to the utility fluids disclosed in U.S. Pat. Nos. 9,090,836; 9,673,694; and 9,777,227; and International Patent Application Publication No.

WO 2018/111574. It should be understood that the utility fluid product can be produced via any suitable process. In some examples, one or more aromatic ring compounds or one or more aromatic ring compounds and one or more non-aromatic ring compounds can be mixed, blended, combined, or otherwise contacted to produce the utility fluid product having the composition discussed and described herein.

The composition of the utility fluid product can be determined using any suitable test method or combination of test methods. In some examples, conventional methods can be used to determine the types and amounts of compounds in the multi-ring classes disclosed above in the utility fluid product (and other compositions), though any method can be used. For example, it has been found that two-dimensional gas chromatography ("2D GC") is a convenient methodology for performing a quantitative analysis of samples of tar, hydroprocessed product, and other streams and mixtures. These methods for identifying the types and amounts of compounds are not meant to foreclose other methods for identifying molecular types and amounts, e.g., other gas chromatography/mass spectrometry (GC/MS) techniques. Methods for determining the composition of the utility fluid product can include those disclosed in U.S. Pat. No. 9,777,227.

As noted above, it has been discovered that the utility fluid product is a hydrogen donor that can bind with fouling precursors in the pitch, the tar product, or a mixture thereof to decrease or prevent foulant formation during transport and/or hydroprocessing thereof. It has also been discovered that the utility fluid product is a hydrogen donor that can that can bind with fouling precursors in the steam cracker effluent to decrease or prevent foulant formation during transport thereof. It has also been discovered that the utility fluid product is a hydrogen donor that can also decrease or prevent fouling in a primary separation stage, e.g., within one or more separator(s) of the first separation stage 165, during separation of products from the steam cracker effluent and/or the cooled steam cracker effluent.

In some examples, the utility fluid product can be contacted with the pitch, the pitch-tar mixture, the steam cracker effluent, and/or the cooled steam cracker effluent prior to and/or during separation of products therefrom, when the pitch, the steam cracker effluent, and/or the cooled steam cracker effluent is at a temperature of ≥300° C., ≥325° C., ≥350° C., ≥375° C., or ≥400° C. to about 425° C., about 450° C., about 475° C., or about 500° C. Without wishing to be bound by theory, it is believed that the elevated temperature of the pitch, the tar product, the steam cracker effluent, and/or the cooled steam cracker effluent contains significant reactive molecules. The utility fluid contains hydrogen radicals that promotes or otherwise improves the rate of hydrogen donation from the utility fluid to the steam cracker effluent stream, e.g., the donation of a hydrogen atom or ion, from the utility fluid product to foulant forming constituents in the pitch, the pitch-tar mixture, the steam cracker effluent or the cooled steam cracker effluent, which can decrease or even prevent fouling.

Advantageously, the utility fluid produced by the pitch or the pitch-tar hydroprocessing can be used as a diluent or a blend component thereof to lessen and/or eliminate reactor fouling during hydroprocessing of the pitch or the pitch-tar mixture. Without being bound by theory, it is believed that the reduction in (or elimination of) reactor fouling is due to the hydrogen donating ability of the utility fluid composition. Hydrogen radicals transfer from the utility fluid to reactive radicals in various effluent streams, thereby mitigating olefin polymerization and minimizing or eliminating primary fractionator fouling. Since they also contain hydrogen-donor compounds, the second liquid phase product and the hydroprocessor heavy product are also useful as quench oil instead of or in addition to utility fluid.

Advantageously, the various utility fluid product streams can be used to mitigate fouling in downstream processing equipment in a stream cracker, such as the primary fractionator. Moreover, the yield of the product is better. Uncontrolled reactions involving reactive radicals, in conventional processes, lead to polymerization and/or coking, which lead to heavier products such as tar, coke, and fuel gas.

The first vapor phase product and the first liquid phase product are separated from the heated mixture. Typically the mixture is heated in the convection section of a furnace, such as in the convection coils located in the convection section of a steam cracking furnace. The mixture comprises hydrocarbon feed and diluent. Typically the diluent comprises water and/or steam. The hydrocarbon feed and/or diluent can be preheated before they are combined to form the mixture. The preheating can be carried out by indirect transfer of heat to the hydrocarbon feed and/or the diluent from flue gases in the convection section of the steam cracking furnace. The hydrocarbon feed typically includes a mixture of hydrocarbon compounds and can further includes impurity compositions such as one or more of sulfur, nitrogen, arsenic, mercury, particulates (e.g., ash), etc. In some examples, the hydrocarbon feed (or for simplicity, hydrocarbon) comprises a mixture of $C_{5+}$ hydrocarbons, e.g., one that is primarily in the liquid phase. In certain aspects the hydrocarbon feed can be or include, but is not limited to, raw crude oil, steam cracked gas oils and residues, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, atmospheric pipestill bottoms, vacuum pipestill streams such as vacuum pipestill bottoms and wide boiling range vacuum pipestill naphtha to gas oil condensates, heavy non-virgin hydrocarbons from refineries, vacuum gas oils, heavy gas oil, naphtha contaminated with crude, atmospheric residue, heavy residue, C4's/residue admixture, naphtha/residue admixture, hydrocarbon gases/residue admixture, hydrogen/residue admixtures, waxy residues, gas oil/residue admixture, or any mixture thereof. In other examples, the hydrocarbon can be or include one or more of naphtha, gas oil, vacuum gas oil, waxy residues, atmospheric residues, residue admixtures, and crude oil or one or more crude oil fractions. In some examples, if the hydrocarbon feed (or preheated hydrocarbon feed) comprises, consists essentially of, or even consists of a primarily liquid phase hydrocarbon feed, e.g., a medium or heavy hydrocarbon. "Primarily liquid phase" in this context means a composition of which ≥50 wt. % is in the liquid phase, e.g., ≥75 wt. %, such as ≥90 wt. %. A hydrocarbon feed is a primarily liquid-phase hydrocarbon feed when ≥50 wt. % of the hydrocarbon feed is in the liquid phase at a temperature of 25° C. and a pressure of 1 bar absolute, e.g., ≥75 wt. %, such as ≥90 wt. %. "Heavy hydrocarbon" means a mixture comprising hydrocarbon, the mixture having an API gravity in the range of from 5° up to (but not including) 22°. "Medium hydrocarbon" means a mixture comprising hydrocarbon, the mixture having an API gravity in the range of from 22° to 30°. A "relatively-heavy" hydrocarbon has an API gravity that is less than that of naphtha. The hydrocarbon feed can be a raw feed such as crude oil. "Raw" feed, e.g., raw hydrocarbon feed, means a primarily liquid-phase feed that comprises ≥25 wt. % of crude oil that has not been subjected to prior desalting and/or prior fractionation with reflux, e.g., ≥50 wt. %, such as ≥75 wt. %, or ≥90 wt. %. "Crude oil" means a mixture comprising naturally-occurring hydrocarbon of geological origin, where the mixture (i) comprises ≥1 wt. % of resid, e.g., ≥5 wt. %, such as ≥10 wt. %, and (ii) has an API gravity ≤52°, e.g., ≤30°, such as ≤20°, or ≤10°, or ≤8°. The crude oil can be classified by API gravity, e.g., heavy crude oil has an API gravity in the range of from 5° up to (but not including) 22°.

Although it is not required, the crude oil can be desalted prior to contacting with the water and/or steam to form the mixture. When the hydrocarbon feed includes a crude oil fraction, the fraction can be produced by separating atmospheric pipestill ("APS") bottoms from the crude oil followed by vacuum pipestill ("VPS") treatment of the APS bottoms. In some examples, the hydrocarbon feed can be or include a crude oil such as a high-sulfur virgin crude oil rich in polycyclic aromatics or a fraction thereof. In other examples, the hydrocarbon feed can be or include a hydroprocessed hydrocarbon, e.g., a crude or resid-containing fraction thereof. In other examples, the hydrocarbon feed can be or include a vapor phase separate from a vacuum resid subjected to a thermal conversion process in a thermal conversion reactor, e.g., a delayed coker, a fluid coker, a flex-coker, a visbreaker, and/or a catalytic hydrovisbreaker). In some examples, the hydrocarbon feed can be or include the hydrocarbons or hydrocarbon feedstocks disclosed in U.S. Pat. Nos. 7,993,435; 8,696,888; 9,327,260; 9,637,694; 9,657,239; and 9,777,227; and International Patent Application Publication No. WO 2018/111574.

The heated mixture comprising the hydrocarbon feed and the diluent can include about 10 wt. %, about 20 wt. %, or about 30 w % to about 70 wt. %, about 80 wt. %, about 90 wt. %, or about 95 wt. % of the water and/or steam, based on a combined weight of the hydrocarbon and the water and/or steam. Heating the mixture typically includes an indirect transfer of heat (e.g., from flue gas in the convection section of a steam cracking furnace) to the diluent-hydrocarbon feed mixture to achieve a mixture temperature of about 450°, about 475° C., about 500° C., about 515° C., or about 530° C. to about 540° C., about 555° C., about 565° C., or about 585° C. The vapor phase product and the liquid phase product can be separated from the heated mixture, e.g., via one or more flash drums or other separator(s). In some examples, the liquid phase product can include hydrocarbons having a minimum boiling point of about 500° C. to about 570° C., about 520° C. to about 550° C., or about 530° C. to about 545° C., as measured according to ASTM D6352-15 or ASTM D2887-16a. Those skilled in the art will appreciate that should an indicated boiling point fall outside the range specified in one or more of these standards, it can be determined by extrapolation. In some examples, the heated mixture can be produced and the vapor phase product and the liquid phase product can be separated therefrom according to the processes and systems disclosed in U.S. Pat. No. 7,993,435. Some illustrative vapor/liquid separation devices and separation stages that can be used to separate the vapor phase product and the liquid phase produce from the heated mixture can also include those disclosed in U.S. Pat. Nos. 7,138,047; 7,090,765; 7,097,758; 7,820,035; 7,311,746; 7,220,887; 7,244,871; 7,247,765; 7,351,872; 7,297,833; 7,488,459; 7,312,371; 6,632,351; 7,578,929; and 7,235,705.

The liquid phase product can be further processed to produce one or more additional hydrocarbon products. For example, the first liquid phase product can be subjected to hydroprocessing conditions to produce a hydroprocessed liquid phase product or first hydroprocessed product. Hydroprocessing the liquid phase product can be carried out in one or more hydroprocessing stages under hydroconversion conditions that are independently selected for each stage, e.g., under conditions for carrying out one or more of pre-treatment, hydrocracking (including selective hydrocracking), hydrogenation, hydrotreating, hydrodesulfurization, hydrodenitrogenation, hydrodemetallation, hydrodearomatization, hydroisomerization, or hydrodewaxing of the liquid phase product, as the case may be. In some examples, the liquid phase product can be hydroprocessed in one or more hydroprocessing units that can include one or more hydroprocessing vessels or zones. The hydroprocessing vessel or zone can include one or more catalysts disposed therein. The catalyst can be in the form of a fixed catalyst bed, a circulating or slurry bed, or any other configuration. The catalyst(s) and amount(s) thereof can be selected from among the same catalysts amounts specified for use in hydroprocessing the pitch-diluent mixture or the pitch-diluent-tar mixture discussed and described below. In some examples, processes and systems that can be used to hydroprocess the first liquid phase product to produce the first hydroprocessed product can include those disclosed in U.S. Pat. Nos. 9,090,836; 9,637,694; and 9,777,227; and International Patent Application Publication No. WO 2018/111574.

In some examples, at least the pitch and one or more hydrocarbon products can be separated from the first hydroprocessed product. Illustrative hydrocarbon products that can be separated from the first hydroprocessed product can be or include, but are not limited to, pitch and at least one of low sulfur fuel oil and hydrocrackate.

The pitch can have a Conradson carbon residue of about 15 w %, about 17 wt. %, about 20 wt. % or about 23 wt. % to about 25 wt. %, about 27 wt. %, about 30 wt. %, about 33 wt. %, or about 35 wt. %, as measured according to ASTM D482-13. The pitch can have an °API gravity measured at a temperature of 15.8° C. of less than 5, less than 3, or less than 1, as measured according to ASTM D287-12b. In some examples, the pitch can have an °API gravity measured at a temperature of 15.8° C. of less than 5 or less than 3, as measured according to ASTM D287-12b. The pitch can include have a sulfur content of about 0.1 wt. %, about 0.5 wt. %, about 0.7 wt. %, about 1 wt. % or about 1.3 wt. % to about 2 wt. %, about 2.5 wt. %, about 3 wt. %, about 3.5 wt. %, or about 4 wt. %. The pitch can have a nitrogen content of about 0.1 wt. %, about 0.2 wt. %, about 0.3 wt. %, or about 0.4 wt. % to about 0.5 wt. %, about 0.6 wt. %, about 0.7 wt. %, or about 0.8 wt. %. In certain aspects, the pitch results from the agglomeration (e.g., fusion) of fusible organic material as may form during hydroprocessing and/or distillation (e.g., via destructive distillation) of the hydroprocessed product. Pitch generally results when the agglomeration halts before the fusible material is fully converted to coke.

The pitch and the diluent, which can be or include the first portion of the utility fluid mixture, can be combined to produce the pitch-diluent mixture. In some examples, the tar product (discussed in more detail below) that can separated from a steam cracker effluent can be combined with the pitch-diluent mixture to produce a pitch-diluent-tar mixture. The pitch-diluent mixture or the pitch-diluent-tar mixture can be hydroprocessed to produce a hydroprocessed product or second hydroprocessed product. The hydroprocessing can be carried out under hydroconversion conditions, e.g., under conditions for carrying out one or more of pre-treatment, hydrocracking (including selective hydrocracking), hydrogenation, hydrotreating, hydrodesulfurization, hydrodenitrogenation, hydrodemetallation, hydrodearomatization, hydroisomerization, or hydrodewaxing, as the case may be, of the pitch or the pitch-tar mixture. In some examples, the pitch-diluent mixture or the pitch-diluent-tar mixture can be hydroprocessed in one or more hydroprocessing units that can include one or more hydroprocessing vessels or zones. The hydroprocessing vessel or zone can include one or more catalysts disposed therein. The catalyst can be in the form of a fixed catalyst bed, a circulating or slurry bed, or any other configuration.

In certain aspects, the pitch-diluent mixture or the pitch-diluent-tar mixture can contact the catalyst in the vessel or zone in the presence of molecular hydrogen. The hydroprocessing conditions can include contacting the pitch-diluent mixture or the pitch-diluent-tar mixture heated to a temperature of about 50° C., about 150° C., about 200° C. or about 220° C. to about 400° C., about 410° C., about 420° C., about 430° C., about 450° C., or about 500° C. with the catalyst in the presence of molecular hydrogen. Liquid hourly space velocity (LHSV) of the pitch-diluent mixture or the pitch-diluent-tar mixture can be about 0.1 $h^{-1}$, about 0.3 $h^{-1}$, about 0.5 $h^{-1}$, or about 1 $h^{-1}$ to about 5 $h^{-1}$, about 10 $h^{-1}$, about 20 $h^{-1}$, about 25 $h^{-1}$, or about 30 $h^{-1}$. The molecular hydrogen partial pressure during the hydroprocessing can be about 0.1 MPa, about 1 MPa, about 2 MPa, or about 3 MPa to about 5 MPa, about 6 MPa, about 7 MPa, or about 8 MPa. In some examples, the hydroprocessing conditions can include, e.g., one or more of a temperature of about 200° C. to about 500° C., a pressure of about 15 bar (absolute), about 20 bar, or about 30 bar to about 100 bar, about 120 bar, or about 135 bar, a space velocity (LHSV) of about 0.1 $h^{-1}$ to about 5 $h^{-1}$, and a molecular hydrogen consumption rate of about 53 standard cubic meters/cubic meter of the pitch or the pitch and the tar product to about 700 standard cubic meters/cubic meter of the pitch or the pitch and the tar product.

When a temperature is indicated for a set of hydroprocessing conditions in a hydroprocessing vessel or zone that includes a catalyst bed, the temperature refers to the average temperature of the catalyst bed in the hydroprocessing zone (one half the difference between the inlet and outlet temperatures of the catalyst bed). When the hydroprocessing reactor contains more than one hydroprocessing zone that each include a catalyst bed, the hydroprocessing temperature is the average temperature in the hydroprocessing reactor (one half the difference between the inlet temperature of the most upstream catalyst bed and the outlet temperature of the most downstream catalyst bed).

In some examples, the pitch-diluent mixture or the pitch-diluent-tar mixture can be hydroprocessed in the presence of molecular hydrogen in one or more pre-treater hydroprocessing stages under a first set of hydroprocessing conditions (pre-treater hydroprocessing conditions) to produce a pre-treated pitch-diluent mixture or a pre-treated pitch-diluent-tar mixture that includes a vapor portion and a liquid portion and the pre-treated pitch-diluent mixture or the pre-treated pitch-diluent-tar mixture can be hydroprocessed under a second set of hydroprocessing conditions (pitch hydroprocessing conditions) to produce the second hydroprocessed product. The pre-treater hydroprocessing conditions and the pitch hydroprocessing conditions typically have at least one process parameter that is different. For example, the pre-treater hydroprocessing conditions can be carried out at a temperature that is less than a temperature used in the pitch hydroprocessing conditions. The pre-treater hydroprocessing conditions are typically carried out in at least one hydroprocessing zone located in at least one pre-treater hydroprocessing stage of a pre-treater hydroprocessor reactor. In some examples, the pre-treater hydroprocessing reactor can be in the form of a conventional hydroprocessing reactor.

The pre-treater hydroprocessing conditions can include one or more of (a) a temperature ($T_{PT}$) of less than or equal to 400° C., e.g., about 100° C. to 400° C., (b) a weight hour space velocity (WHSV$_{PT}$) of ≥0.3 $hr^{-1}$ to about 30 $hr^{-1}$ based on the weight of the pitch-diluent mixture or the pitch-diluent-tar mixture, (c) a total pressure ($P_{PT}$) of ≥6 MPa or ≥8 MPa to about 15.2 MPa, and (d) in the presence of molecular hydrogen supplied at a rate (SR') of less than 534, e.g., about 50 to about 400, standard cubic meters per cubic meter of the pitch-diluent mixture or the pitch-diluent-tar mixture. In some examples, the pre-treater hydroprocessing conditions can include one or more of (a) a $T_{PT}$ of about 220° C. to about 300° C., (b) a WHSV$_{PT}$ of about 1.5 $hr^{-1}$ or about 2 $hr^{-1}$ to about 2.5 $hr^{-1}$ or about 3 $hr^{-1}$, (c) a $P_{PT}$ of ≥6 MPa or ≥8 MPa to about 10 MPa, about 12 MPa, or about 13.1 MPa, and (d) in the presence of molecular hydrogen supplied at a rate (SR$_{PT}$) of about 50, about 53, about 100, about 150, or about 175 standard cubic meters per cubic meter of the pitch-diluent mixture or the pitch-diluent-tar mixture to about 178, about 200, about 250, about 300, about 400, about 500, or about 530 standard cubic meters per cubic meter of the pitch-diluent mixture or the pitch-diluent-tar mixture. In the pre-treater hydroprocessing conditions, the molecular hydrogen can be consumed at a rate of about 10, about 15, about 18, about 20, about 25, about 30, or about 40 standard cubic meters per cubic meter of the tar product to about 80, about 85, about 90, about 95, about 100, about 105, about 107, about 110, or about 120 standard cubic meters per cubic meter of the pitch in the pitch-diluent mixture or the pitch and tar in the pitch-diluent-tar mixture.

In particular aspects, the pre-treater hydroprocessing conditions include one or more of $T_{PT}$≥150° C., e.g., ≥200° C. but less than $T_P$ (e.g., $T_{PT}$≤$T_P$−10° C., such as $T_{PT}$≤$T_P$−25° C., such as $T_{PT}$≤$T_P$−50° C.), a total pressure $P_{PT}$ that is ≥8 MPa but less than $P_P$, WHSV$_{PT}$≥0.2 $hr^{-1}$, ≥0.25 $hr^{-1}$, or ≥0.3 $hr^{-1}$ and greater than WHSV$_P$ (e.g., WHSV$_{PT}$≥WHSV$_P$+0.01 $hr^{-1}$, such as ≥WHSV$_P$+0.05 $hr^{-1}$, or ≥WHSV$_P$+0.1 $hr^{-1}$, or ≥WHSV$_P$+0.5 $hr^{-1}$, or ≥WHSV$_P$+1 $hr^{-1}$, or ≥WHSV$_P$+10 $hr^{-1}$, or more), and a molecular hydrogen consumption rate in the range of from 150 standard cubic meters of molecular hydrogen per cubic meter of the pitch in the pitch-diluent mixture or the pitch and tar in the pitch-diluent-tar mixture (S $m^3/m^3$) to about 400 standard cubic meters of molecular hydrogen per cubic meter of the of the pitch in the pitch-diluent mixture or the pitch and tar in the pitch-diluent-tar mixture (S $m^3/m^3$) (845 SCF/B to 2250 SCF/B) but less than that of pitch hydroprocessing. The pretreatment hydroprocessing conditions typically include $T_{PT}$ in the range of from 260° C. to 300° C.; WHSV$_{PT}$ in the range of from 1.5 $hr^{-1}$ to 3.5 $hr^{-1}$, e.g., 2 $hr^{-1}$ to 3 $hr^{-1}$; a $P_{PT}$ in the range of from 6 MPa to 13.1 MPa; and a molecular hydrogen consumption rate in the range of from 100 standard cubic feet per barrel of the pitch in the pitch-diluent mixture or the pitch and tar in the pitch-diluent-tar mixture (SCF/B) (18 S $m^3/m^3$) to 600 standard cubic feet per barrel of the pitch in the pitch-diluent mixture or the pitch and tar in the pitch-diluent-tar mixture (SCF/B) (107 S $m^3/m^3$). Although the amount of molecular hydrogen supplied to a hydroprocessing stage operating under pretreatment hydroprocessing conditions is generally selected to achieve the desired molecular hydrogen partial pressure, it is typically in a range of about 300 standard cubic feet per barrel of tar-utility fluid mixture (SCF/B) (53 S m³/m³) to about 1000 standard cubic feet per barrel of the pitch-utility fluid mixture or of the pitch-utility fluid-tar mixture (SCF/B) (178 S m³/m³). Optionally, one or more stages for solids-removal and/or guard-bed hydroprocessing are carried out upstream of the pretreater, as disclosed in U.S. Patent Application No. 62/716,754.

The molecular hydrogen can be combined with the pitch-diluent mixture or the pitch-diluent-tar mixture upstream of the hydroprocessing unit and/or introduced directly to the hydroprocessing unit. The molecular hydrogen can be relatively pure hydrogen or can be in the form of a "treat gas" or "tail gas" that contains sufficient molecular hydrogen for use in the first set of hydroprocessing conditions and optionally includes other gases (e.g., nitrogen and light hydrocarbons such as methane) that generally do not adversely interfere with or affect either the reactions or the products. In some examples, the treat gas can include ≥50 vol % of molecular hydrogen, ≥75 vol % of molecular hydrogen, or ≥90 vol % of molecular hydrogen to about 100 vol % of molecular hydrogen.

The hydroprocessing of the pitch-diluent mixture or the pitch-diluent-tar mixture under the pre-treater hydroprocessing conditions can be carried out in the presence of a catalytically-effective amount of at least one catalyst having activity for hydrocarbon hydroprocessing. Illustrative catalysts can include, but are not limited to, conventional hydroprocessing catalysts such as those used in resid and/or heavy oil hydroprocessing. Illustrative catalysts can include, but are not limited to, bulk metallic catalysts and/or supported catalysts. The metals can be in elemental form or in the form of a compound. In some examples, the catalyst can be or include at least one metal from any of Groups 5 to 10 of the Periodic Table of the Elements (tabulated as the Periodic Chart of the Elements, The Merck Index, Merck & Co., Inc., 1996). Examples of such metals include, but are not limited to, copper, vanadium, chromium, molybdenum, tungsten, manganese, technetium, rhenium, iron, cobalt, nickel, ruthenium, palladium, rhodium, osmium, iridium, platinum, or mixtures thereof. Suitable conventional catalysts include one or more of RT-621, which is described as a resid conversion catalyst in Advances of Chemical Engineering 14, table XXIII, Academic Press, 1989; KF860 available from Albemarle Catalysts Company LP, Houston Tex.; NEBULA® Catalyst, such as NEBULA® 20, available from the same source; CENTERA® catalyst, available from Criterion Catalysts and Technologies, Houston Tex., such as one or more of DC-2618, DN-2630, DC-2635, and DN-3636; ASCENT® Catalyst, available from the same source, such as one or more of DC-2532, DC-2534, and DN-3531; and FCC pre-treat catalyst, such as DN3651 and/or DN3551, available from the same source.

In some examples, the catalyst can include a total amount of Groups 5 to 10 metals per gram of catalyst of ≥0.0001 grams, ≥0.001 grams, or ≥0.01 grams to about 1 gram, where the grams are calculated on an elemental basis. For example, the catalyst can include a total amount of Group 5 to 10 metals of about 0.0001 grams, about 0.001 grams, or about 0.05 grams to about 0.08 grams, about 0.1 grams, about 0.3 grams, or about 0.6 grams. In some examples, the catalyst can also include, in addition to at least one metal from any of Groups 5 to 10, at least one Group 15 element. An example of a Group 15 element is phosphorus. When a Group 15 element is utilized, the catalyst can include a total amount of elements of Group 15 of about 0.000001 grams, about 0.00001 grams, about 0.00005 grams, or about 0.0001 grams to about 0.001 grams, about 0.03 grams, about 0.06 grams, or about 0.1 grams, where the grams are calculated on an elemental basis.

The pitch-diluent mixture or the pitch-diluent-tar mixture can primarily be in the liquid phase when subjected to the pre-treater hydroprocessing conditions. For example, about 60 wt. %, about 75 wt. %, about 80 wt. %, about 85 wt. %, or about 90 wt. % to about 95 wt. %, about 97 wt. %, about 99 wt. %, or about 100 wt. % of the pitch-diluent mixture or the pitch-diluent-tar mixture can be in the liquid phase when subjected to the pre-treater hydroprocessing conditions. The pre-treater hydroprocessing conditions can produce a pre-treated pitch-diluent mixture or a pre-treated pitch-diluent-tar mixture that can include (i) a vapor portion that can include unreacted treat gas, primarily vapor products derived from the treat gas and the pitch or the pitch and the tar product and (ii) a liquid portion that can include unreacted pitch or unreacted pitch and unreacted tar product and other products, e.g., cracked products derived from the pitch or the pitch and the tar product that can be produced during the first set of hydroprocessing conditions.

In some examples, the liquid portion and the vapor portion in the pre-treated pitch-diluent mixture or the pre-treated pitch-diluent-tar mixture can be separated. The vapor portion can be upgraded to remove impurities, e.g., sulfur compounds and/or light paraffinic hydrocarbon, and the upgraded vapor can be re-cycled as a treat gas for use in hydroprocessing the pitch-diluent mixture or the pitch-diluent-tar mixture, for example. The liquid portion can be hydroprocessed under the pitch hydroprocessing conditions to produce the first hydroprocessed product. In other examples, the pre-treated pitch-diluent mixture or the pre-treated pitch-diluent-tar mixture, i.e., both the vapor portion and liquid portion, can be hydroprocessed under the second set of hydroprocessing conditions to produce the second hydroprocessed product. In some examples, prior to subjecting the pre-treated pitch-diluent mixture or the pre-treated pitch-diluent-tar mixture or the liquid portion separated therefrom to the second set of hydroprocessing conditions, the pre-treated pitch-diluent mixture or the pre-treated pitch-diluent-tar mixture or the liquid portion separated therefrom can be processed, e.g., subjected to additional solids removal processes.

The pitch hydroprocessing conditions can be carried out in at least one hydroprocessing vessel or zone located in at least one pitch hydroprocessing stage of a pitch hydroprocessor reactor. In some examples, the pitch hydroprocessor reactor can be in the form of a conventional hydroprocessing reactor. The catalyst(s) and amount(s) thereof can be selected from among the same catalysts amounts specified for use in the first hydroprocessing set of conditions.

The pitch hydroprocessing conditions can include one or more of (a) a temperature ($T_P$) of ≥200° C. to about 500° C., (b) a weight hour space velocity ($WHSV_P$) of ≥0.3 hr⁻¹ to about 20 hr⁻¹ based on a weight of the pre-treated pitch-diluent mixture or the pre-treated pitch-diluent-tar mixture that is subjected to the pitch hydroprocessing, (c) a total pressure ($P_P$) of ≥6 MPa or ≥8 MPa to about 14 MPa, and (d) in the presence of molecular hydrogen supplied at a rate ($SR_P$) of about 150 to about 1,780, e.g., ≥534, standard cubic meters per cubic meter of the pre-treated pitch-diluent mixture or the pre-treated pitch-diluent-tar mixture. In some examples, the pitch hydroprocessing conditions can include one or more of (a) a $T_P$ of about 250° C., about 275° C., about 300° C., about 350° C., about 360° C., or about 375° C. to about 390° C., about 400° C., about 410° C., about 425° C., about 450° C., about 475° C., or about 500° C., (b)

a WHSV$_P$ of about 0.5 hr$^{-1}$, about 0.7 hr$^{-1}$, about 0.9 hr$^{-1}$, about 1 hr$^{-1}$, 1.2 hr$^{-1}$, or about 1.5 hr$^{-1}$ to about 5 hr$^{-1}$, about 10 hr$^{-1}$, about 15 hr$^{-1}$, or about 20 hr$^{-1}$, (c) a SR$_P$ of about 150, about 178, about 300, about 534, about 550, about 575, about 600, or about 650 standard cubic meters per cubic meter of the pre-treated pitch-diluent mixture or the pre-treated pitch-diluent-tar mixture to about 700, about 800, about 900, about 1,000, about 1,250, about 1,500 or about 1,750 standard cubic meters per cubic meter of the pre-treated pitch-diluent mixture or the pre-treated pitch-diluent-tar mixture, and (d) a P$_P$ of ≥6 MPa or ≥8 MPa to about 10 MPa, about 12 MPa, or about 13.1 MPa. In the pitch hydroprocessing conditions the molecular hydrogen can be consumed at a rate of about 62, about 80, about 100, about 125, about 150, about 250, about 285, or about 300 standard cubic meters per cubic meter of the pitch in the pre-treated pitch-diluent mixture or the pitch and tar product in the pre-treated pitch-diluent-tar mixture to about 500, about 550, about 570, about 600, or about 625 standard cubic meters per cubic meter of the pitch in the pre-treated pitch-diluent mixture or the pitch and tar product in the pre-treated pitch-diluent-tar mixture. In some examples, the pitch hydroprocessing conditions can also include a molecular hydrogen partial pressure during the hydroprocessing of ≥2.75 MPa, ≥3.5 MPa, ≥5 MPa, ≥6 MPa, ≥8 MPa, or ≥11 MPa to about 14 MPa or less, about 13 MPa or less, or about 12 MPa or less. In some examples, the molecular hydrogen partial pressure during the pitch hydroprocessing conditions can be about 14 MPa or less, about 13 MPa or less, or about 12 MPa or less.

The molecular hydrogen can be combined with the pre-treated pitch-diluent mixture or the pre-treated pitch-diluent-tar mixture or the liquid portion separated therefrom upstream of the hydroprocessing unit and/or introduced directly to the second hydroprocessing unit. The molecular hydrogen can be relatively pure hydrogen or can be in the form of a "treat gas" or "tail gas" that contains sufficient molecular hydrogen for use in the first set of hydroprocessing conditions and optionally includes other gases (e.g., nitrogen and light hydrocarbons such as methane) that generally do not adversely interfere with or affect either the reactions or the products. In some examples, the treat gas can include ≥50 vol % of molecular hydrogen, ≥75 vol % of molecular hydrogen, or ≥90 vol % of molecular hydrogen to about 100 vol % of molecular hydrogen. In some examples, the pitch-diluent mixture or the pitch-diluent-tar mixture can be hydroprocessed to produce the second hydroprocessed product according to the processes and systems disclosed in U.S. Pat. Nos. 9,090,836; 9,637,694; and 9,777,227; and International Patent Application Publication No. WO 2018/111574.

In some examples, at least a hydroprocessor heavy product and the utility fluid product can be separated from the second hydroprocessed product. In other examples, a hydroprocessor heavy product, the utility fluid product, and optionally an overhead can be separated from the second hydroprocessed product.

The second liquid phase product, the first hydroprocessed product, and the hydroprocessor heavy product are themselves valuable products, and can be used, e.g., as a relatively high-sulfur fuel oil (high sulfur in comparison with the low sulfur fuel oil in line 117) or as a blending component thereof. Non-limiting examples of blendstocks suitable for blending with one or more of the second liquid phase product, the first hydroprocessed product and the hydroprocessor heavy product include one or more of bunker fuel; burner oil; heavy fuel oil, e.g., No. 5 and No. 6 fuel oil; high-sulfur fuel oil; low-sulfur fuel oil; regular-sulfur fuel oil (RSFO); gas oil as may be obtained from the distillation of crude oil, crude oil components, and hydrocarbon derived from crude oil (e.g., coker gas oil), and the like. For example, the second liquid phase product can be used as a blending component to produce a fuel oil composition comprising <0.5 wt. % sulfur. Although the second liquid phase product and the hydroprocessor heavy product are improved products over the pitch, the tar product, or a mixture thereof, and are useful as fuel or blendstock "as-is", it is typically beneficial to carry out further processing.

The hydroprocessor heavy product has desirable properties, e.g., a 15° C. density that is typically ≥0.10 g/cm$^3$ less than the density of the pitch, the tar product, or a blend thereof. For example, the hydroprocessor heavy product can have a density that is ≥0.12, or ≥0.14, or ≥0.15, or ≥0.17 g/cm$^3$ less than the density of the pitch, the tar product, or a blend thereof. The hydroprocessor heavy product's 50° C. kinematic viscosity is typically ≤1000 cSt. For example, the viscosity of the hydroprocessor heavy product can be ≤500 cSt, e.g., ≤150 cSt, such as ≤100 cSt, or ≤75 cSt, or ≤50 cSt, or ≤40 cSt, or ≤30 cSt. Generally, the pitch hydroprocessing results in a significant viscosity improvement over the pretreated pitch or the pretreated pitch and tar mixture. For example, when the 50° C. kinematic viscosity of the tar product (e.g., obtained as feed from a tar knock-out drum) is ≥1.0×10$^4$ cSt, e.g., ≥1.0×10$^5$ cSt, ≥1.0×10$^6$ cSt, or ≥1.0×10$^7$ cSt, the 50° C. kinematic viscosity of the hydroprocessor heavy product is typically <200 cSt, e.g., ≤150 cSt, such as ≤100 cSt, or ≤75 cSt, or ≤50 cSt, or ≤40 cSt, or ≤30 cSt. Particularly when the tar product has a sulfur content ≥1 wt. %, upstream of the pre-treater hydroprocessor, the hydroprocessor heavy product typically has a sulfur content ≥0.5 wt. %, e.g., in a range of about 0.5 wt. % to about 0.8 wt. %. In some examples, the hydroprocessor heavy product can have a sulfur content of <0.5 wt. %, such as about 0.05 wt. % to about 0.4 wt. %. In some examples, the hydroprocessor heavy product can have a density of <0.99 g/cm$^3$, a cetane value of ≥20, a CCAI of <870, a sulfur content of <0.5 wt. %, and a sediment content of <0.1 wt. %.

In some examples, the hydroprocessor heavy product can be further processed, e.g., subjected to additional hydroprocessing, to adjust or otherwise modify one or more properties thereof. The additional hydroprocessing (not shown in the figures) can be carried out under conditions (re-treater hydroprocessing conditions) that are typically more severe than those of the tar pre-treater (itself a hydroprocessor) or the tar hydroprocessor. Aromatic content of the utility fluid is not affected by the additional hydroprocessing because the utility fluid is recovered before the additional hydroprocessing. The utility fluid is not needed during the additional hydroprocessing because, e.g., the tar hydroprocessor and optionally the pre-treater sufficiently decrease the content of foulant precursors in the feed to the additional hydroprocessor. The product of such additional hydroprocessing can be a first fuel oil and/or a blending component thereof. The hydroprocessor heavy product and the utility fluid product can be separated from the first hydroprocessed product according to the processes and systems disclosed in U.S. Pat. Nos. 9,090,836; 9,637,694; 9,777,227; and International Patent Application Publication No. WO 2018/111574.

Typically, the additional hydroprocessing is carried out under re-treater hydroprocessing conditions in at least one hydroprocessing zone located in at least one re-treater hydroprocessing stage of a re-treater hydroprocessor reactor with little or no utility fluid. The re-treater hydroprocessing conditions, which are typically more severe than the pitch hydroprocessing conditions, can include a temperature ($T_R$) ≥360° C.; a space velocity ($WHSV_R$)≤0.6 hr$^{-1}$, based on the weight of the hydroprocessor heavy product subjected to the re-treater hydroprocessing conditions; a molecular hydrogen supply rate ≥2500 standard cubic feet per barrel of hydroprocessed hydroprocessor heavy product (SCF/B) (445 S m$^3$/m$^3$); a total pressure ("$P_R$")≥3.5 MPa, e.g., ≥6 MPa; and $WHSV_R$<$WHSV_P$. The retreatment hydroprocessing conditions typically include $T_R$≥370° C.; e.g., in the range of from 370° C. to 415° C.; $WHSV_R$≤0.5 hr$^{-1}$, e.g., in the range of from 0.2 hr$^{-1}$ to 0.5 hr$^{-1}$; a molecular hydrogen supply rate ≥3000 SCF/B, e.g., in the range of from 3000 SCF/B (534 S m$^3$/m$^3$) to 6000 SCF/B (1068 S m$^3$/m$^3$); and a total pressure ("$P_R$")≥6 MPa, e.g., in the range of from 6 MPa to 13.1 MPa. Optionally, $T_R$≥TT and/or $WHSV_R$<$WHSV_P$. One product of the additional hydroprocessing is heavy hydrocarbon comprising re-treated pitch or re-treated pitch-tar.

The re-treated hydroprocessor heavy product, whether derived from hydroprocessing the pitch-diluent or the pitch-diluent-tar mixture, typically has a sulfur content ≤0.3 wt. %, e.g., ≤0.2 wt. %. Other properties of the re-treated hydroprocessor heavy product include a hydrogen:carbon molar ratio ≥1.0, e.g., ≥1.05, such as ≥1.10, or ≥1.055; an $S_{BN}$≥185, such as ≥190, or ≥195; an $I_N$≤105, e.g., ≤100, such as ≤95; a 15° C. density ≤1.1 g/cm$^3$, e.g., ≤1.09 g/cm$^3$, such as ≤1.08 g/cm$^3$, or ≤1.07 g/cm$^3$; a flash point ≥, or ≤−35° C. Generally, the re-treated hydroprocessor heavy product has 50° C. kinematic viscosity that is less than that of the hydroprocessor heavy product, and is typically ≤1000 cSt, e.g., ≤900 cSt, such as ≤800 cSt. The retreating generally results in a significant improvement in in one or more of viscosity, solvent blend number, insolubility number, and density over that of the hydroprocessor heavy product fed to the retreater. Desirably, since the retreating can be carried out without utility fluid, these benefits can be obtained without utility fluid hydrogenation or cracking.

The re-treated hydroprocessor heavy product can be utilized as a fuel and/or blended with one or more blendstocks, e.g., to produce a lubricant or fuel, e.g., a transportation fuel. Suitable blendstocks include those specified for blending with the second liquid phase product, the first hydroprocessed product and the hydroprocessor heavy product. Selected conditions for the pre-treater hydroprocessing conditions, the pitch hydroprocessing conditions, and the re-treater hydroprocessing conditions, and the properties of certain products and by-products can include those disclosed in WO Publication No. WO2018/111574.

Returning to the vapor phase product, the vapor phase product can be subjected to steam cracking conditions sufficient to produce the steam cracker effluent. Illustrative steam cracking conditions can include, but are not limited to, one or more of: exposing the vapor phase product to a temperature (as measured at a radiant outlet of a steam cracking apparatus) of ≥400° C., e.g., a temperature of about 700° C., about 800° C., or about 900° C. to about 950° C., a pressure of about 0.1 bar to about 5 bars (absolute), and/or a steam cracking residence time of about 0.01 seconds to about 5 seconds. In some examples, the vapor phase can be introduced to a radiant section of a steam cracking furnace to produce the steam cracker effluent. In some examples, the vapor phase product can be steam cracked according to the processes disclosed in U.S. Pat. Nos. 6,419,885; 7,993,435; 9,637,694; and 9,777,227; and International Patent Application Publication No. WO 2018/111574.

As discussed above, in some examples, the steam cracker effluent can be directly contacted with the quench fluid, which can be or can include a second portion of the utility fluid product, to produce a cooled steam cracker effluent. In some examples, the steam cracker effluent can also be cooled by indirect heat exchange with a quench medium, e.g., liquid water or steam, before, during, and/or after the steam cracker effluent is directly contacted with the quench fluid. For example, the steam cracker effluent can be cooled by indirect heat exchange, e.g., via one or more transfer line exchangers, with steam to produce superheated steam and a pre-cooled steam cracker effluent. The quench fluid, which can be or can include the second portion of the utility fluid product, can be directly contacted with the pre-cooled steam cracker effluent to produce the cooled steam cracker effluent.

In some examples, a plurality of products can be separated from the cooled steam cracker effluent. In some examples, the tar product and the process gas that can include ethylene and propylene can be separated from the cooled steam cracker effluent. In other examples, the tar product and at least one of a tail gas, ethane, propane, ethylene, propylene, benzene, crude $C_4$ hydrocarbons, steam cracker naphtha, and/or steam cracker gas oil, can be separated from the cooled steam cracker effluent. In some examples, a motor gasoline ("mogas") blendstock can be produced. Mogas blendstock is a mixture that includes $C_4$-$C_{12}$ hydrocarbons having an initial normal boiling point of about 35° C. and a final boiling point of about 200° C. The mogas blendstock can include stabilized steam cracker naphtha produced by hydroprocessing the steam cracker naphtha in the presence of a catalyst and molecular hydrogen, e.g., molecular hydrogen in the tail gas. The tail gas can include, but is not limited to, molecular hydrogen, methane, or a mixture thereof. In some examples, the tar product and at least two, at least three, at least four, at least five, at least six, at least seven, or all of molecular hydrogen, ethane, ethylene, propane, propylene, crude $C_4$ hydrocarbons, steam cracker naphtha, and steam cracker gas oil can be separated from the cooled steam cracker effluent.

In some examples, conventional separation equipment can be used to separate the tar product and other products, e.g., the process gas, from the cooled steam cracker effluent. For example, one or more flash drums, knock out drums, fractionators, water-quench towers, indirect condensers, etc. In some examples, illustrative separation stages can include those disclosed in U.S. Pat. No. 8,083,931, for example. In other examples, the products that can be separated from the cooled steam cracker effluent, e.g., the tar product and at least one of ethylene and propylene, can be separated according to the processes and systems disclosed in U.S. Patent Application Publication No. 2014/0357923.

The tar product can be separated from the cooled steam cracker effluent itself and/or from one or more streams that have been separated from the cooled steam cracker effluent. For example, the tar product can be separated from a steam cracker gas oil stream and/or a bottoms stream of the steam cracker's primary fractionator, from flash-drum bottoms (e.g., the bottoms of one or more tar knock out drums located downstream of the pyrolysis furnace and upstream of the primary fractionator), or a combination thereof. In some examples, the tar product can be or include a mixture of primary fractionator bottoms and tar knock-out drum bottoms.

The tar product can be or include, but is not limited to, a mixture of hydrocarbons having one or more aromatic components and, optionally, non-aromatic and/or non-hydrocarbon molecules, the mixture being derived from hydrocarbon pyrolysis, with ≥70% to about 100% of the mixture having a boiling point at atmospheric pressure that is ≥290°

C., e.g., 290° C. to about 500° C. In some examples, the tar product can have an initial boiling point of ≥200° C. In other examples, ≥90 wt. % to about 100 wt. % of the tar product can have a boiling point at atmospheric pressure ≥290° C., e.g., 290° C. to about 500° C. In other examples, the tar product can include ≥50 wt. %, ≥75 wt. %, or ≥90 wt. % to about 97 wt. %, about 99 wt. %, or about 100 wt. % of hydrocarbon molecules (including mixtures and aggregates thereof), based on the weight of the tar product, and (i) one or more aromatic components and (ii) a number of carbon atoms of ≥15, e.g., 15 to about 100. In some examples, the tar product can have a metals content of about 100 ppmw to about 2,000 ppmw, e.g., about 1,000 ppmw or less, based on the weight of the tar product. In some examples, the tar product can be what is also sometimes referred to as pyrolysis tar obtained from steam cracking.

The tar product can also include tar heavies. "Tar heavies" are a product of hydrocarbon pyrolysis having an atmospheric boiling point of ≥565° C. and can include ≥5 wt. %, e.g., 5 wt. % to about 20 wt. %, about 50 wt. %, about 75 wt. %, or about 100 wt. %, of molecules having a plurality of aromatic cores based on the weight of the product. The tar heavies are typically solid at 25° C. and generally include the fraction of the tar product that is not soluble in a 5:1 (vol:vol) ratio of n-pentane:tar product at 25° C. Tar heavies can also include asphaltenes and other high molecular weight molecules.

In some examples, the tar product can include about 5 wt. % to about 40 wt. % of tar heavies, based on the weight of the tar product, can have an °API gravity measured at a temperature of 15.8° C. of 8.5 or less, e.g., about 1 to about 8.5, as measured according to ASTM D287-12b, and can have a 50° C. viscosity of about 200 cSt to about 10,000,000 cSt, as measured according to ASTM D445-17a. In some examples, the tar product can also have a sulfur content of about 0.5 wt. %, about 1 wt. %, about 1.5 wt. %, or about 2 wt. % to about 4 wt. %, about 5 wt. %, about 6 wt. %, or about 7 wt. %, based on the weight of the tar product. In other examples, the tar product can include less than 0.5 wt. %, less than 0.3 wt. %, less than 0.1 wt. %, or less than 0.05 wt. % of sulfur, based on the weight of the tar product.

In some examples, the tar product can include about 5 wt. % to 40 wt. % of tar heavies, based on the weight of the tar product, can have a density at 15° C. of about 1.01 g/cm3 to about 1.19 g/cm3, and can have a 50° C. viscosity of ≥200 cSt to about 10,000,000 cSt. In some examples, the tar product can have a 50° C. kinematic viscosity of ≥10,000 cSt, or ≥100,000 cSt, to about 1,000,000 cSt, or about 10,000,000 cSt or more. Optionally, the tar product can have an $I_N$ greater than 80 and greater than 70 wt. % of the tar product's molecules can have an atmospheric boiling point of ≥290° C. Typically, the tar product can have an insoluble content of ≥0.5 wt. %, ≥1 wt. %, ≥2 wt. %, ≥4 wt. %, or ≥5 wt. % to about 6 wt. %, about 8 wt. %, or about 10 wt. % or more. The insolubles content refers to the amount (in wt. %) of components of a hydrocarbon-containing composition that are insoluble in a mixture of 25% by volume heptane and 75% by volume toluene. Determination of the insolubles content is well-known and can determined according to the procedure disclosed in International Patent Application Publication No. WO 2018/111574.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, patent application publications, test procedures, and other documents cited in this application are fully incorporated by reference herein to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A hydrocarbon upgrading process, comprising:
separating a vapor phase product and a liquid phase product from a heated mixture comprising steam and a hydrocarbon feed;
hydroprocessing the liquid phase product to produce a first hydroprocessed product;
separating a pitch and one or more hydrocarbon products from the first hydroprocessed product;
contacting the pitch with a diluent to produce a pitch-diluent mixture;
hydroprocessing the pitch-diluent mixture to produce a second hydroprocessed product;
separating a hydroprocessor heavy product and a utility fluid product from the second hydroprocessed product, wherein the diluent comprises a first portion of the utility fluid product, and wherein the utility fluid product comprises an aromatic ring compound;
steam cracking the vapor phase product to produce a steam cracker effluent; and
separating a tar product and a process gas comprising ethylene and propylene from the steam cracker effluent.

2. The process of claim 1, wherein the pitch is at a temperature of at least 300° C. when contacted with the diluent, and wherein the pitch has a Conradson carbon residue of about 20 wt. % to about 30 wt. %, an ° API gravity measured at a temperature of 15.8° C. of less than 5, a sulfur content of about 1 wt. % to about 3 wt. %, and a nitrogen content of about 0.3 wt. % to about 0.6 wt. %.

3. The process of claim 1, further comprising contacting the steam cracker effluent with a quench fluid comprising a second portion of the utility fluid product to produce a cooled steam cracker effluent, wherein the tar product and the process gas are separated from the cooled steam cracker effluent.

4. The process of claim 1, further comprising contacting the steam cracker effluent with a third portion of the utility fluid product during separation of the tar product and the process gas from the steam cracker effluent.

5. The process of claim 1, further comprising:
contacting the steam cracker effluent with a quench fluid comprising a second portion of the utility fluid product to produce a cooled steam cracker effluent, wherein the steam cracker effluent is at a temperature of at least 300° C. when initially contacted with the second portion of the utility fluid product, and wherein the tar product and the process gas are separated from the cooled steam cracker effluent; and contacting the cooled steam cracker effluent with a third portion of the utility fluid product during separation of the tar product and the process gas from the cooled steam cracker effluent, wherein the cooled steam cracker effluent is at a temperature of at least 300° C. when initially contacted with the third portion of the utility fluid product.

6. The process of claim 1, further comprising combining the tar product with the pitch-diluent mixture to produce a pitch-diluent-tar mixture, wherein the pitch-diluent-tar mixture is hydroprocessed to produce the second hydroprocessed product.

7. The process of any of claim 1, wherein hydroprocessing the pitch-diluent mixture comprises hydroprocessing the pitch-diluent mixture under pre-treater hydroprocessing conditions to produce a pre-treated pitch-diluent mixture comprising a vapor portion and a liquid portion and hydroprocessing the pre-treated pitch-diluent mixture under pitch hydroprocessing conditions to produce the second hydroprocessed product.

8. The process of claim 7, wherein:
the pre-treater hydroprocessing conditions comprises hydroprocessing the pitch-diluent mixture at a temperature ($T_{PT}$) of 400° C. or less, a weight hour space velocity ($WHSV_{PT}$) of at least 0.3 hr$^{-1}$ based on a weight of the pitch-diluent mixture that is subjected to the pre-treater hydroprocessing conditions, a total pressure ($P_{PT}$) of at least 6 MPa, and in the presence of molecular hydrogen supplied at a rate ($SR_{PT}$) of less than 534 standard cubic meters per cubic meter of the pitch-diluent mixture,
the pitch hydroprocessing conditions comprises hydroprocessing the pre-treated pitch-diluent mixture at a temperature ($T_p$) of at least to 200° C., a weight hour space velocity ($WHSV_p$) of at least 0.3 hr$^{-1}$ based on a weight of the pre-treated pitch-diluent mixture, a total pressure ($P_2$) of at least 6 MPa, and in the presence of molecular hydrogen supplied at a rate ($SR_p$) of ≥534 standard cubic meters per cubic meter of the pre-treated pitch-diluent mixture, and $WHSV_p$ is less than $WHSV_{PT}$.

9. The process of claim 1, wherein the utility fluid product comprises: (a) at least 1 wt. % of 1.0 ring class compounds, (b) at least 5 wt. % of 1.5 ring class compounds, and (c) at least 5 wt. % of 2.0 ring class compounds, wherein the weight percent values of (a), (b), and (c) are based on a weight of the utility fluid product.

10. The process of claim 1, wherein the liquid phase product comprises hydrocarbons having a minimum boiling point of about 500° C. to about 570° C., and wherein the pitch has a Conradson carbon residue of about 20 wt. % to about 30 wt. %, an ° API gravity measured at a temperature of 15.8° C. of less than 5, a sulfur content of about 1 wt. % to about 3 wt. %, and a nitrogen content of about 0.3 wt. % to about 0.6 wt. %.

11. A hydrocarbon upgrading process, comprising:
heating in a furnace a mixture comprising an aqueous diluent and hydrocarbon feed to produce a heated mixture, wherein the hydrocarbon feed comprises primarily liquid phase hydrocarbon;
separating a vapor phase product and a liquid phase product from the heated mixture;
hydroprocessing the liquid phase product to produce a first hydroprocessed product;

separating a pitch and one or more hydrocarbon products from the first hydroprocessed product, wherein the pitch has a Conradson carbon residue of about 20 wt. % to about 30 wt. %, an ° API gravity measured at a temperature of 15.8° C. of less than 5, a sulfur content of about 1 wt. % to about 3 wt. %, and a nitrogen content of about 0.3 wt. % to about 0.6 wt. %;

combining the pitch with a diluent to produce a pitch-diluent mixture comprising about 5 wt. % to about 95 wt. % of the diluent, based on a combined weight of the pitch and the diluent;

hydroprocessing the pitch-diluent mixture to produce a second hydroprocessed product;

separating a hydroprocessor heavy product and a utility fluid product from the second hydroprocessed product, wherein the diluent comprises a first portion of the utility fluid product, and wherein the utility fluid product comprises: (a) at least 1 wt. % of 1.0 ring class compounds, (b) at least 5 wt. % of 1.5 ring class compounds, and (c) at least 5 wt. % of 2.0 ring class compounds, wherein the weight percent values of (a), (b), and (c) are based on a weight of the utility fluid product;

introducing the vapor phase product into the furnace and steam cracking the vapor phase product in the furnace to produce a steam cracker effluent; and separating a tar product and a process gas comprising ethylene and propylene from the steam cracker effluent.

12. The process of claim 11, further comprising contacting the steam cracker effluent with a quench fluid comprising a second portion of the utility fluid product to produce a cooled steam cracker effluent, wherein the steam cracker effluent is at a temperature of at least 300° C. when initially contacted with the second portion of the utility fluid product, and wherein the tar product and the process gas are separated from the cooled steam cracker effluent.

13. The process of claim 12, further comprising contacting the cooled steam cracker effluent with a third portion of the utility fluid product during separation of the tar product and the process gas from the cooled steam cracker effluent, wherein the cooled steam cracker effluent is at a temperature of at least 300° C. when initially contacted with the third portion of the utility fluid product.

14. The process of claim 11, wherein hydroprocessing the pitch-diluent mixture comprises hydroprocessing the pitch-diluent mixture under pre-treater hydroprocessing conditions to produce a pre-treated pitch-diluent mixture comprising a vapor portion and a liquid portion and hydroprocessing the pre-treated pitch-diluent mixture under pitch hydroprocessing conditions to produce the second hydroprocessed product.

15. The process of claim 14, wherein:
the pre-treater hydroprocessing conditions comprises hydroprocessing the pitch-diluent mixture at a temperature ($T_{pt}$) of 400° C. or less, a weight hour space velocity ($WHSV_{PT}$) of at least 0.3 hr$^{-1}$ based on a weight of the pitch-diluent mixture that is subjected to the pre-treater hydroprocessing conditions, a total pressure ($P_{PT}$) of at least 6 MPa, and in the presence of molecular hydrogen supplied at a rate ($SR_{PT}$) of less than 534 standard cubic meters per cubic meter of the pitch-diluent mixture
the pitch hydroprocessing conditions comprises hydroprocessing the pre-treated pitch-diluent mixture at a temperature ($T_p$) of at least to 200° C., a weight hour space velocity ($WHSV_p$) of at least 0.3 hr$^{-1}$ based on a weight of the pre-treated pitch-diluent mixture, a total pressure (P$_2$) of at least 6 MPa, and in the presence of molecular hydrogen supplied at a rate (SR$_P$) of ≥534 standard cubic meters per cubic meter of the pre-treated pitch-diluent mixture, and WHSV$_p$ is less than WHSV$_{PT}$.

16. The process of claim 15, wherein:

T$_{PT}$ is about 220° C. to about 300° C.,

WHSV$_{PT}$ is about 1.5 hr$^{-1}$ to about 3.5 hr$^{-1}$,

SR$_{PT}$ is about 53 standard cubic meters per cubic meter of the pitch-diluent mixture to about 178 standard cubic meters per cubic meter of the pitch-diluent mixture, P$_{PT}$ is at least 6 MPa to about 13.1 MPa, in the first set of hydroprocessing conditions the molecular hydrogen is consumed at a rate of about 18 standard cubic meters per cubic meter of the pitch in the pitch-diluent mixture to about 107 standard cubic meters per cubic meter of the pitch in the pitch-diluent mixture, T$_p$ is about 360° C. to about 410° C., WHSV$_p$ is about 0.5 hr$^{-1}$ to about 1.2 hr$^{-1}$, SR$_P$ is about 534 standard cubic meters per cubic meter of the pre-treated pitch-diluent mixture to about 890 standard cubic meters per cubic meter of the pre-treated pitch-diluent mixture, P$_p$ is at least 6 MPa to about 13.1 MPa, and in the second set of hydroprocessing conditions the molecular hydrogen is consumed at a rate of about 285 standard cubic meters per cubic meter of the pitch in the pre-treated pitch-diluent mixture to about 570 standard cubic meters per cubic meter of the pitch in the pre-treated pitch-diluent mixture.

17. The process of claim 11, wherein the liquid phase product comprises hydrocarbons having a minimum boiling point of about 500° C. to about 570° C., and wherein the primarily liquid phase hydrocarbon includes one or more of raw feed, crude oil, heavy hydrocarbon, and medium hydrocarbon.

18. The process of claim 11, wherein hydroprocessing the liquid phase product to produce the first hydroprocessed product comprises hydroprocessing the liquid phase product at a temperature ("T$_{FLP}$") ≥200° C., a total pressure (P$_{FLP}$) ≥3.5 MPa, a weight hour space velocity (WHSV$_{FLP}$) ≥0.3 hr$^{-1}$ based on a weight of the first liquid phase product that is subjected to the hydroprocessing, and in the presence of a total amount of molecular hydrogen supplied at a rate that is ≥178 standard cubic meters per cubic meter of the first liquid phase product subjected to the hydroprocessing.

19. The process of claim 11, wherein hydroprocessing the pitch-diluent mixture to produce the first hydroprocessed product comprises hydrocracking the pitch in the pitch-diluent mixture.

20. The process of claim 11, wherein the pitch-diluent mixture comprises about 5 wt. % to about 95 wt. % of the utility fluid product, based on a weight of the pitch.

21. A hydrocarbon upgrading process, comprising:

producing a heated mixture comprising steam and hydrocarbon by indirectly heating a hydrocarbon feed in a furnace, and combining the hydrocarbon feed with an aqueous stream comprising water, steam, or a mixture thereof, wherein (i) the heating is carried out before, during, and/or after the hydrocarbon feed is combined with the aqueous stream, and (ii) the hydrocarbon includes one or more of naphtha, gas oil, vacuum gas oil, waxy residues, atmospheric residues, residue admixtures, and crude oil;

separating a vapor phase product and a liquid phase product from the heated mixture, wherein the separation does not include steam stripping of the liquid phase and/or the heated mixture;

hydroprocessing the liquid phase product to produce a first hydroprocessed product;

separating a pitch and one or more hydrocarbon products from the first hydroprocessed product, wherein the pitch has a Conradson carbon residue of about 20 wt. % to about 30 wt. %, an ° API gravity measured at a temperature of 15.8° C. of less than 5, a sulfur content of about 1 wt. % to about 3 wt. %, and a nitrogen content of about 0.3 wt. % to about 0.6 wt. %;

combining the pitch with a diluent to produce a pitch-diluent mixture;

hydroprocessing the pitch-diluent mixture under pre-treater hydroprocessing conditions to produce a pre-treated pitch-diluent mixture comprising a vapor portion and a liquid portion, wherein the pre-treater hydroprocessing conditions comprises hydroprocessing the pitch-diluent mixture at a temperature (T$_{PT}$) of 400° C. or less, a weight hour space velocity (WHSV$_{PT}$) of at least 0.3 hr$^{-1}$ based on a weight of the pitch-diluent mixture that is subjected to the pre-treater hydroprocessing conditions, a total pressure (PPT) of at least 6 MPa, and in the presence of molecular hydrogen supplied at a rate (SRPT) of less than 534 standard cubic meters per cubic meter of the pitch-diluent mixture;

hydroprocessing the pre-treated pitch-diluent mixture under pitch hydroprocessing conditions to produce a second hydroprocessed product, wherein the pitch hydroprocessing conditions comprises hydroprocessing the pre-treated pitch-diluent mixture at a temperature (T$_p$) of at least to 200° C., a weight hour space velocity (WHSV$_p$) of at least 0.3 hr$^{-1}$ based on a weight of the pre-treated pitch-diluent mixture, a total pressure (P$_2$) of at least 6 MPa, and in the presence of molecular hydrogen supplied at a rate (SR$_P$) of ≥534 standard cubic meters per cubic meter of the pre-treated pitch-diluent mixture, and wherein WHSV$_p$ is less than WHSV$_{PT}$;

separating a hydroprocessor heavy product and a utility fluid product from the second hydroprocessed product, wherein the diluent comprises a first portion of the utility fluid product, wherein the pitch-diluent mixture comprises about 5 wt. % to about 95 wt. % of the utility fluid product, based on a weight of the pitch, and wherein the utility fluid product comprises: (a) at least 1 wt. % of 1.0 ring class compounds, (b) at least 5 wt. % of 1.5 ring class compounds, and (c) at least 5 wt. % of 2.0 ring class compounds, wherein the weight percent values of (a), (b), and (c) are based on a weight of the utility fluid product;

exposing the vapor phase product to a temperature of at least 400° C. under steam cracking conditions to produce a steam cracker effluent;

contacting the steam cracker effluent with a quench fluid comprising a second portion of the utility fluid product to produce a cooled steam cracker effluent, wherein the steam cracker effluent is at a temperature of at least 300° C. when initially contacted with the second portion of the utility fluid product; and separating a tar product and a process gas comprising ethylene and propylene from the cooled steam cracker effluent, wherein the cooled steam cracker effluent is contacted with a third portion of the utility fluid product during separation of the tar product and the process gas from the cooled steam cracker effluent, and wherein the cooled steam cracker effluent is at a temperature of at least 300° C. when initially contacted with the third portion of the utility fluid product.

22. A system for upgrading a hydrocarbon, comprising:
a steam cracker configured to indirectly heat a mixture comprising steam and a hydrocarbon to produce a heated mixture and to steam crack a vapor phase product separated from the heated mixture to produce a steam cracker effluent;
a first separator configured to separate the vapor phase product and a liquid phase product from the heated mixture;
a first hydroprocessing unit configured to hydroprocess the liquid phase product to produce a first hydroprocessed product;
a second separator configured to separate a pitch and one or more hydrocarbon products form the first hydroprocessed product;
a first transfer line configured to introduce a diluent to the pitch to produce a pitch-diluent mixture;
a second hydroprocessing unit configured to hydroprocess the pitch-diluent mixture to produce a second hydroprocessed product;
a third separator configured to separate a second vapor phase product and a second liquid phase product from the second hydroprocessed product;
a fourth separator configured to separate a hydroprocessor heavy product and a utility fluid product from the second liquid phase product, wherein the diluent comprises a first portion of the utility fluid product, and wherein the utility fluid product comprises an aromatic ring compound; and
a fifth separator configured to separate a tar product and a process gas comprising ethylene and propylene from the steam cracker effluent.

23. The system of claim 22, further comprising a second transfer line configured to introduce a second portion of the utility fluid product to the steam cracker effluent to produce a cooled steam cracker effluent, wherein the fourth separator is configured to separate the tar product and the process gas from the cooled steam cracker effluent.

24. The system claim 21, further comprising a third transfer line configured to introduce a third portion of the utility fluid product into the fifth separator such that the third portion of the utility fluid product contacts the steam cracker effluent during separation of the tar product and the process gas from the steam cracker effluent.

25. The system of claim 22, wherein the second hydroprocessing unit is configured to hydroprocess the pitch-diluent mixture under a first set of hydroprocessing conditions to produce a pre-treated pitch-diluent mixture and is configured to hydroprocess the pre-treated pitch-diluent mixture under a second set of hydroprocessing conditions to produce the second hydroprocessed product.

* * * * *